United States Patent [19]
Baxter et al.

[11] Patent Number: 6,122,756
[45] Date of Patent: Sep. 19, 2000

[54] HIGH AVAILABILITY COMPUTER SYSTEM AND METHODS RELATED THERETO

[75] Inventors: William F. Baxter, Holliston; Robert G. Gelinas, Westboro; James M. Guyer, Northboro; Dan R. Huck, Shrewsbury; Michael F. Hunt, Ashland; David L. Keating, Holliston, all of Mass.; Jeff S. Kimmell, Chapel Hill, N.C.; Phil J. Roux, Holliston, Mass.; Liz M. Truebenbach, Sudbury, Mass.; Rob P. Valentine, Auburn, Mass.; Pat J. Weiler, Northboro, Mass.; Joseph Cox, Middleboro, Mass.; Barry E. Gillott, Fairport, N.Y.; Andrea Heyda, Acton, Mass.; Rob J. Pike, Northboro, Mass.; Tom V. Radogna, Westboro, Mass.; Art A. Sherman, Maynard, Mass.; Micheal Sporer, Wellesley, Mass.; Doug J. Tucker, Northboro, Mass.; Simon N. Yeung, Waltham, Mass.

[73] Assignee: Data General Corporation, Westboro, Mass.

[21] Appl. No.: 09/011,721
[22] PCT Filed: Aug. 14, 1996
[86] PCT No.: PCT/US96/13742
  § 371 Date: Feb. 10, 1998
  § 102(e) Date: Feb. 10, 1998
[87] PCT Pub. No.: WO97/07457
  PCT Pub. Date: Feb. 27, 1997

Related U.S. Application Data

[60] Provisional application No. 60/002,320, Aug. 14, 1995.
[51] Int. Cl.[7] ..................................................... G06F 11/00
[52] U.S. Cl. ................................ 714/30; 714/3; 714/710
[58] Field of Search .................................. 714/3, 30, 10, 714/724, 25, 733, 55, 11, 718; 713/400

[56] References Cited

U.S. PATENT DOCUMENTS 3,069,562  12/1962  Steele ...................................... 307/88.5
3,226,569  12/1965  James ...................................... 307/88.5

(List continued on next page.)

*Primary Examiner*—Robert W. Beausoliel, Jr.
*Assistant Examiner*—Pierre Eddy Elisca
*Attorney, Agent, or Firm*—Dike, Bronstein, Roberts & Cushman, LLP; Sewall P. Bronstein; William J. Daley, Jr.

[57] ABSTRACT

A high availability computer system and methodology including a backplane, having at least one backplane communication bus and a diagnostic bus, a plurality of motherboards, each interfacing to the diagnostic bus. Each motherboard also includes a memory system including main memory distributed among the plurality of motherboards and a memory controller module for accessing said main memory interfacing to said motherboard communication bus. Each motherboard also includes at least one daughterboard, detachably connected to thereto. The motherboard further includes a backplane diagnostic bus interface mechanism interfacing each of the motherboards to the backplane diagnostic bus; a microcontroller for processing information and providing outputs and a test bus controller mechanism including registers therein. The system further includes a scan chain that electrically interconnects functionalities mounted on each motherboard and each of the at least one daughter board to the test bus controller; and an applications program for execution with said microcontroller. The applications program including instructions and criteria to automatically test the functionalities and electrical connections and interconnections, to automatically determine the presence of one or more faulted components and to automatically functionally remove the faulted component(s) from the computer system. Also featured is a balanced clock tree circuit that automatically and selectively supplies certain clock pulses to the logical flip/flops of an ASIC. The system further includes redundant clock generation and distribution circuitry that automatically fails to the redundant clock circuitry in the event of a failure of the normal clock source.

37 Claims, 19 Drawing Sheets

U.S. PATENT DOCUMENTS

| | | | |
|---|---|---|---|
| 4,644,498 | 2/1987 | Bedard et al. | 364/900 |
| 4,801,869 | 1/1989 | Sprogis | 324/73 |
| 4,873,685 | 10/1989 | Mills, Jr. | 371/36 |
| 4,920,540 | 4/1990 | Baty | 371/61 |
| 4,939,694 | 7/1990 | Eaton et al. | 714/710 |
| 4,961,013 | 10/1990 | Obermeyer, Jr. et al. | 307/480 |
| 5,146,585 | 9/1992 | Smith, III | 395/550 |
| 5,157,781 | 10/1992 | Harwood et al. | 395/575 |
| 5,159,273 | 10/1992 | Wright et al. | 324/537 |
| 5,260,979 | 11/1993 | Parker et al. | 375/108 |
| 5,271,019 | 12/1993 | Edwards et al. | 371/22.3 |
| 5,285,153 | 2/1994 | Ahanin et al. | 324/158 |
| 5,392,297 | 2/1995 | Bell et al. | 371/22.6 |
| 5,396,619 | 3/1995 | Walton | 395/575 |
| 5,485,604 | 1/1996 | Miyoshi et al. | 395/182.08 |
| 5,487,074 | 1/1996 | Sullivan | 371/22.3 |
| 5,519,714 | 5/1996 | Nakamura et al. | 371/22.3 |
| 5,533,188 | 7/1996 | Palumbo | 395/182.02 |
| 5,535,405 | 7/1996 | Byers et al. | 395/800 |

Microcontroller Powerup Tests

Per-Board Microcontroller Tests
    Microcontroller Self-Test
        • Instruction Set
        • Built-In EEPROM checksum
        • On-Chip SRAM
    Motherboard EEPROM Tests for Vector and JP code
        • Checksum verification
    Local SRAM Write/Read Test
    Microcontroller Resources Test
        • Machs
        • Clock checks
    DUART Tests for Opcon
    Diagnostic Bus Interface Test
    NOVRAM Checksum and Write/Read Test
    RTCTest Per-Board Microcontroller Scan Tests
    Per-Board Microcontroller Boundary Scan
        • Mailbox Scan Testing
        • Motherboard TAP Integrity Test (TAPIT) & Blind Interrogation
        • Motherboard SEEPROM Test
        • Motherboard Boundary Scan Test
        • $JP_0$ Daughter board TAPIT & Blind Interrogation
        • $JP_0$ Daughter board SEEPROM Test
        • $JP_0$ Daughter board Scan Test
        • $JP_1$ Daughter board TAPIT & Blind Interrogation
        • $JP_1$ Daughter board SEEPROM Test
        • $JP_1$ Daughter board Scan Test
        • Motherboard/ $JP_0$ Daughter board Interconnect Test
        • Motherboard/ $JP_1$ Daughter board Interconnect Test
        • Limited Misc Resources Scan Test
        • PCI Card Presence & Scan Test (if applicable)

*FIG. 13A*

Per-Board Microcontroller Scan Tests Cont'd

Per-Board Microcontroller Internal Scan
        •Motherboard Per-ASIC Internal TAPIT
        •Motherboard Per-ASIC Internal Sanity Test
        •Motherboard Per-ASIC Internal Scan Initialization
        •$JP_0$ Per-ASIC Internal TAPIT
        •$JP_0$ Per-ASIC Internal Sanity Test
        •$JP_0$ Per-ASIC Internal Scan Initialization
        •$JP_1$ Per-ASIC Internal TAPIT
        •$JP_1$ Per-ASIC Internal Sanity Test
        •$JP_1$ Per-ASIC Internal Scan Initialization Master Microcontroller System-Level Scan Testing
        System (SCAN Bridge) Sizing & Scanbox Sanity
        System ID SEEPROM Test
        Power Supply TAPIT & Scan Test
        Blower TAPIT & Scan Test
        Backpanel Board Interconnect Scan Testing
        P1 Reinitialization

*FIG. 13B*

JP Powerup Tests
(run by every JP on every board)

88110 CPU Instruction Set Test

PROM Checksum

PROM Access (i.e., read several locations and compare the results)

Local SRAM Read/Write Tests

Local SRAM Access (i.e., read and write several locations, then compare the results)

NOVRAM Tests
    Write/Read Test
    Checksum

88110/88410 Cache Tests
    88410 RAM Test
    88410 PTAG Test
    88410 MTAG Test
    88110 Cache Test Write and Read to each ASIC's control registers (i.e., PI, RI, GG, MC, CI, and TLCC)

Test for each ASIC's RAM (TLCC and GG)

Local Main Memory Access (i.e., read and write to several locations on BANK 0 SIMM 0, then compare the results)

Off-Board JP Access (i.e., read and write to NOVRAM on other boards using the RI's back door method, then compare the results)

*FIG. 14*

Board-Master JP Powerup Tests
(these tests will be run by one, maybe up to
4 JPs in parallel on a board)

JP Motherboard-Related Tests
    JP Handshake Test
    Data Alignment Test
    Intercept Test
    Cross-Interrupt & NMI Tests
    PIT Test
    TLCC Functional Test (TBD)
    EDAC Tests Memory-Related Tests MC functional Test
        •Error Reporting EDAC Chips
        •EDAC (Forced ECC) Test
        •EDAC Loopback Test Directory DRAM Tests
        •Force ECC Test
        •Word Test
        •Address=Data Test
        •Address=~Data Test
        •Stuck-Ats
        •Data Unique Test
        •Address Unique Test
        •Functional Test e.g. address driver
        •Moving Inversions

*FIG. 15A*

Memory-Related Tests Cont'd
> Near (On-Board) Memory Tests
>> •Byte Test
>>
>> •Half-word Test
>>
>> •Word Test
>>
>> •Double-Word Test
>>
>> •Address=Data Test
>>
>> •Address=~Data Test
>>
>> •Stuck-Ats
>>
>> •Data Unique Test
>>
>> •Address Unique Test
>>
>> •Moving Inversions I/O Tests The I/O Tests will be run by the Board-Master of each motherboard after I/O initialization has occurred. These tests will be run in parallel and will be initiated by the microcontroller.

> •GG Register Accesses (run by all JPs)
>
> •Integrated SCSI (NCRC825) Tests
>> - SCSI Controller Test
>> - SCSI Internal Loopback
>> - SCSI External Loopback (if there is a dedicated device)
>> - SCSI Memory-to-Memory Move Test
>> - SCSI XMEM Function Test
>
> •Integrated LAN Tests
>> - LAN Controller Test
>> - LAN Internal Function Test
>> - LAN Interrupt Test
>> - LAN Internal Loopback Test
>> - LAN External Loopback Test (if there is a network connected)

*FIG. 15B*

Diagnostic-Master JP System-Wide Tests

Slave JP (each one) access to Global Resources

Full Memory Range Address Access Test

Multi-JP Tests
- A. Cache-Inhibited XIMEMs
- B. Cached XMEMs
- C. Swap/Invalidates
- D. Shared Block Writes
- E. RBOS Shared Memory Test (XDIAG Only)

*FIG. 16*

HIGH AVAILABILITY COMPUTER SYSTEM AND METHODS RELATED THERETO

This application claims the benefit of U.S. Provisional Application Serial No. 60/002,320 filed Aug. 14, 1995, the teaching of which are incorporated herein by reference.

FIELD OF INVENTION

The present invention relates to computer systems and more particularly to a high availability computer system that automatically senses, diagnoses and de-configures/re-configures a faulted computer system to improve availability as well as related methods for providing high availability.

BACKGROUND OF THE INVENTION

When procuring a computer system in a business environment, an important factor considered is the availability of the computer to perform/operate. This can affect profitability as well as work/job performance. There are four basic design concepts used alone or in combination to improve availability.

One design technique is commonly referred to as "fault tolerant." A computer system employing this technique is designed to withstand a hard fault that could shut down another type of computer system. Such a design typically involves replicating hardware and software so an applications program is running simultaneously in multiple processors. In this way, if a hard fault occurs in one processor or subsystem, the application program running in the other processor(s)/subsystem(s) still provides an output. Thus, as to the user, the computer system has performed its designated task. In addition to multiple processors, a voting scheme can be implemented, whereby the outputs from the multiple processors are compared to determine the correct output.

Fault tolerant systems are complex, essentially require multiple independent processing systems and, as such, are very expensive. Further, although the system is fault tolerant, once a fault occurs it is necessary for a service representative to arrive on site, diagnosis and repair the faulted path/sub-system. This makes maintenance expensive.

Another technique, involves designing components such that they are highly reliable and, therefore, unlikely to fail during an operational cycle. This technique is common for space, military and aviation applications where size and weight limitations of the intended use (e.g., a satellite) typically restrict the available design techniques. Highly reliable components are typically expensive and also make maintenance activities expensive to maintain these design characteristics.

Such expenses may make a computer system commercially unacceptable for a given application. In any event, once a system has a failure, a service representative must be dispatched to diagnosis and repair the failed system. When dealing with military/aviation applications, the vehicle/item housing the failed component must be brought to a repair facility. However, until the system is repaired it is unavailable. As such, this increases maintenance costs and makes such repairs/replacement activities critical path issues.

A third technique involves clustering multiple independent computer systems together such that when one computer system fails, its work is performed by any one of the other systems in the cluster. This technique is limited to those applications where there are, or there is a need for, a number of independent systems. It is not usable for a stand alone system. Also, in order for this type of system to work each independent computer system must be capable of accessing the data and application program of any of the systems in the cluster. For example, a central data storage device (e.g. hard drive) is provided that can be accessed by any of the computer systems. In addition to the limited applicability, the foregoing is complex, expensive and raises data security issues.

A fourth technique involves providing redundant power supplies and blowers. Thus, the failure of a blower or power supply does not result in shutdown of the computer system. However, providing redundancy for other computer systems components is not viable because a service representative must be brought in to diagnosis the cause of failure so the machine can be repaired and returned to operability.

The fourth technique also has included providing a computer system with a mechanism to automatically re-boot the system following a system crash or hang. This technique may allow recovery from transient problems, however, there is no diagnosing done in connection with restoring the system to operability. Thus, if the system is faulted a service representative must be brought in to diagnosis the cause of failure so the machine can be repaired and restored to operation.

As such, there is a need for a computer system that can automatically recover from a large percentage of the potential failure modes (i.e., recover without requiring operator/service rep. action). In particular, there is a need for a methodology that involves self-diagnosis by a computer of its and its components' functionally, as well as a computer being capable of de-configuring/re-configuring system hardware to isolate the failed component(s). Thus, allowing the computer to automatically continue system operation albeit in a possibly degraded condition. There also is a need for a computer system having such high availability design characteristics.

SUMMARY OF THE INVENTION

The methods and multi-processor computer system of the present invention result from the realization that availability of multiple processor computer systems is improved by designing the system so it automatically senses and diagnosis any of a number of failures that interrupt system operation. Further, upon diagnosing and isolating the failure that would prevent continued system operation, the computer system automatically de-configures the system so the isolated failed component/sub-system is functionally removed from system. The computer system then automatically re-boots itself, the operating system and applications program.

The computer system continues operation, albeit in a degraded condition, until the failed component is replaced/repaired by a service representative. However, and in contrast to other computer systems, this replacement can be scheduled around normal system operation (e.g., replacement during non-production hours). In this way, repair and/or replacement activities are not critical path issues to restoring system operability. In general, most systems, particularly multi-processor type of computer systems, can be operated in a degraded condition with little or no real performance penalty.

The computer system also is designed so a complete system diagnosis is performed in parallel at power-up by scanning the system (i.e, chips and boards) to identify any component/sub-system failures. In this way, the system is verified as being in a run condition before any code is loaded. This is preferable to finding a faulted condition after the system has gone into operation. The scanning includes using integrated JTAG test logic, to locate open and short circuits at the chip and at the board level, as well as to determine the functionality of the application specific integrated circuits, processor and boards comprising the system. The scanning operation performed during power up also includes initializing any one of a number of the ASICs.

This yields a simple, fast and low cost diagnosis and repair strategy that can be implemented in various stages or levels commensurate with the cost and type of use for the computer system. In its broadest application, the system automatically de-configures and re-configures the system around virtually all failures that can lead to a system failure while providing accurate and complete fault isolation and detection. However, it is within the scope of the instant invention to tailor the amount of system redundancy required to allow continued system operation based on the intended use as well as to minimize the user's cost.

In addition, to components of the processing operation of the computer system, the system is configured to included N+1 redundant blowers and power supplies. The power supplies are preferably grouped so each power supply grouping supplies power to a discrete portion of the system. Preferably, there are N+1 power supplies provided for each group. The blowers and power supplies are hot repairable so they can be replaced in the field without shutting the system down.

The high availability computer system further includes a microcontroller mounted on each motherboard and a diagnostic bus that, in conjunction with an applications program and board mounted components (e.g., scan chain, test bus controller), perform diagnostic tests to determine the integrity of the system prior to the loading of any applications program.

The application specific integrated circuits on each motherboard and daughter board include a gated balanced clock tree to supply the clocks to the logical flip/flops (F/F). The clock tree includes a clock trunk with a plurality of branches extending therefrom. An AND gate is disposed in at least one of the branches and is under the control of control circuitry so that only certain clock pulses are passed through to the logical F/Fs.

The control circuitry is configured so the AND gate automatically allows pulses to pass through the branches during a first operational condition of the computer system, i.e., normal system operation, and so the AND gate blocks the pulses when the system is in a second operational condition, i.e., when the system experiences a fatal error. The control circuitry is also configured so pulses are passed when the computer system undergo diagnostic testing.

The system also includes two redundant clock generation and distribution circuits where one circuit is designated as being the source of system clocks. If a failure to generate the clock pulses is identified, the clock generation and distribution circuitry automatically causes the system to failover to the redundant clock circuitry and the system returned to service. Preferably, the circuitry is mounted on each motherboard of the system. In a specific embodiment, the clock generation and distribution circuitry on the motherboard in slot 0 of the backplane is the normal source of system clocks and the backup source is the circuitry mounted on the motherboard in slot 1.

In sum, the above methodology of the instant invention yields a high availability computer system that can be configured based on the intended use and cost of the system. Thus, the amount of system redundancy required to allow continued system operation can be tailored to the use as well as to minimize the user's cost. Such systems allow the repair or replacement of failed components to be scheduled for those times where it would have the least impact on the user.

DEFINITIONS

The instant invention is most clearly understood with reference to the following definitions:

"ASIC" shall be understood to mean application specific integrated circuit.

"Board Master JP" shall be understood to mean the lowest-numbered functional job processor/central processing unit on each motherboard. The board master is determined by running isolated board-level tests.

"Degrade", and the related terms, shall be understood to mean the loss or removal of a component, e.g., a FRU, from a computer system. An actual reduction in operation or performance of the computer system may or may not occur with the loss or removal of the component.

"Diagnostic Master JP (DM)" shall be understood to mean the job processor/central processing unit in the system that coordinates all inter-board testing and in control when the system first halts into the main user interface.

"Fault detection" shall be understood to mean the ability to recognize that a failure has occurred and that current system data may be corrupted.

"Fault Isolation/Isolation of Fault", and the related terms, shall be understood to mean the ability to identify the location of the failure to some level of definition. Isolation may be defined at the system, sub-system, board, component, FRU or sub-FRU-level.

"FRU" shall be understood to mean field replaceable unit. The field replaceable unit is a component (e.g., board, daughter board, bus, power supply, blower) of a computer system that is designed to be removed and replaced as a unit in the field by a field service representative (i.e., not repaired in field).

"Master Microcontroller" shall be understood to mean the microcontroller in the system that does basic sizing of which boards exist and tests off-board scanning, including the midplane SEEPROM.

"Scannable Mailbox" shall be understood to mean a register accessed through the DBUS by microcontrollers as a means of communication.

"SEEPROM" shall be understood to mean Serial Electrically Erasable Programmable Read Only Memory. There is one of these on each FRU except for SIMMs.

"TCK" shall be understood to mean test clocks, the IEEE 1149.1 Test Clock signal.

"TMS" shall be understood to mean the IEEE 1149.1 Test Mode Select signal.

"TDI" shall be understood to mean the IEEE 1149.1 Test Data In signal.

"TDO" shall be understood to mean the IEEE 1149.1 Test Data Out signal.

"TRST" shall be understood to mean the IEEE 1149.1 Test Reset signal.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein:

FIGS. 13A, B is a tabulation of power up tests performed by the microcontroller;

FIGS. 14 is a tabulation of the power up tests performed by the job processor (JP);

FIGS. 15A, B is a tabulation of the power up tests performed by the diagnostic master JP; and FIG. 16 is a tabulation of the power tests performed by the diagnostic mater JP.

DESCRIPTION OF THE PREFERRED EMBODIMENT

Figure 1A:
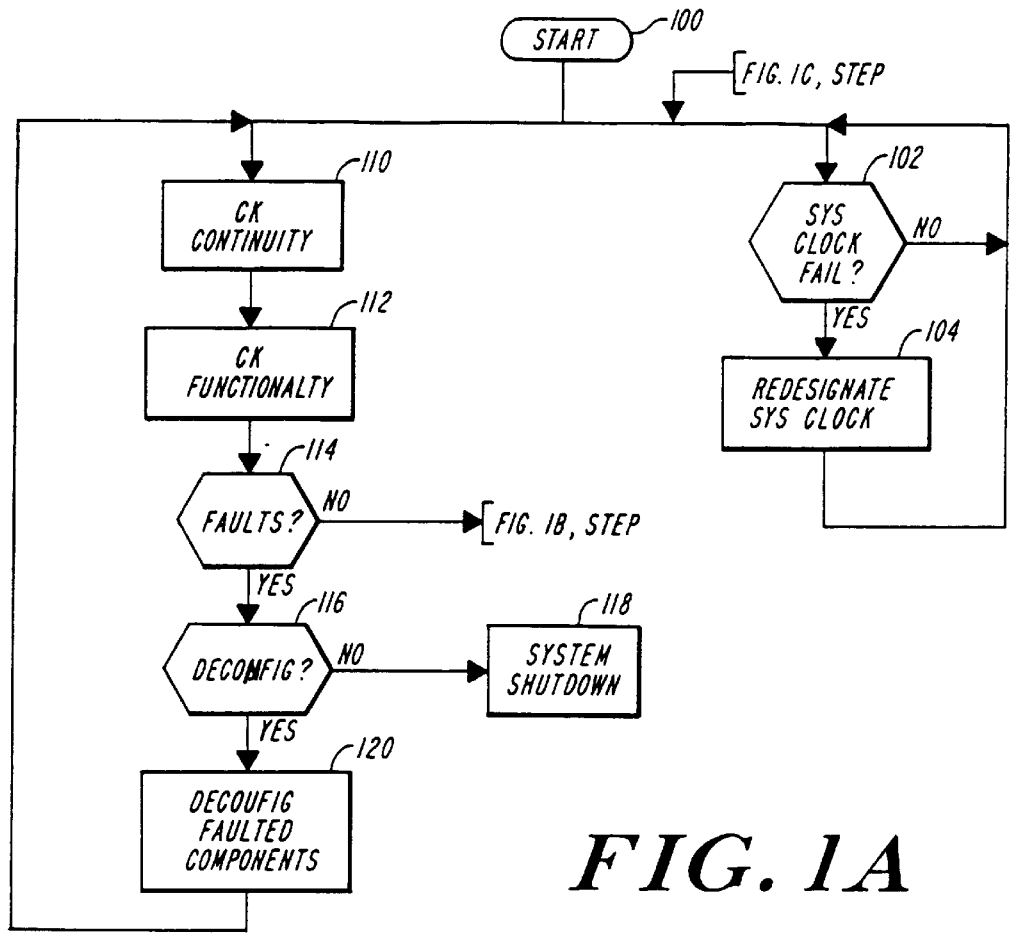
FIGS. 1A–C is a high level flow chart of the high availability methodology for a multiple parallel processor.
Figure 1B:
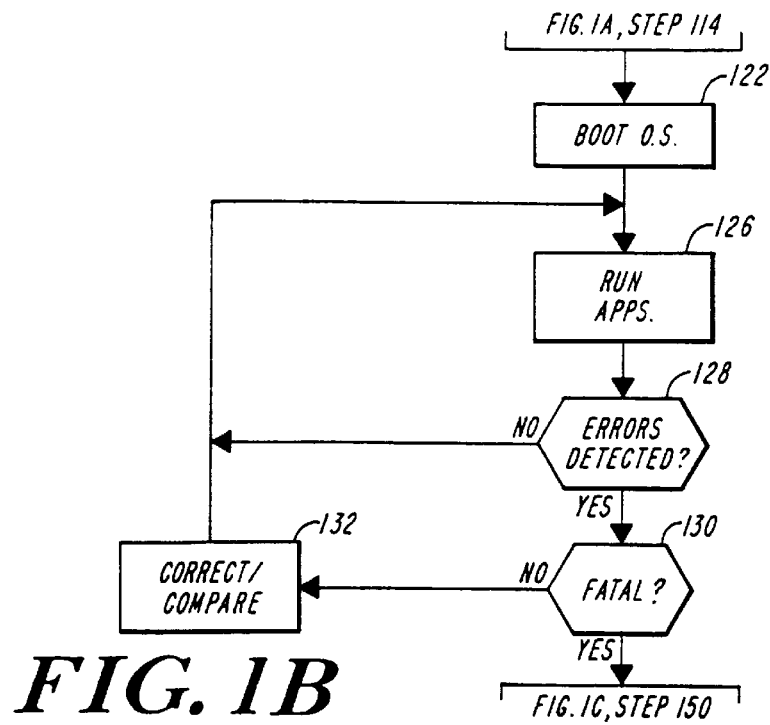
Figure 1C:
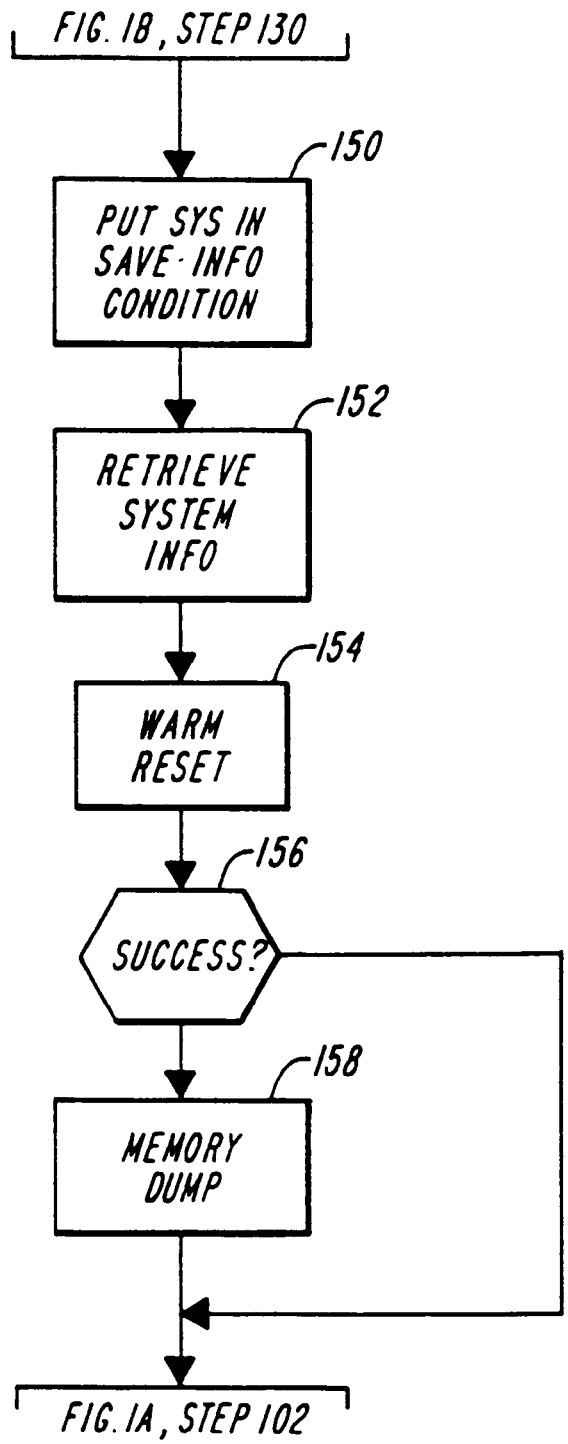

Referring now to the various figures of the drawing wherein like reference characters refer to like parts, there is shown in FIGS. 1A–C a flow chart of the high availability methodology for a multiple processor computer system of the instant invention. The computer system and associated methodology of the instant invention yields a system that successfully detects a failure event occurring while running the users application code, isolates the event to at least a FRU, de-configures the FRU/faulted component, reboots the operating system and reboots the user application code. This process of detection, isolation, de-configuration and rebooting is performed automatically by the computer system without requiring user/service representative interaction/input.

When the computer system is being powered-up or started, step 100, the power systems controller performs a number of functions. This includes bringing operating voltages to nominal values, bringing the blower fans up to normal speed and appropriately clearing any diagnostic interrupts or other status under its control. While in this mode, other functions of the computer system are inhibited. It should be noted, that system operation is not limited to the illustrative sequence of operations, but rather operations may be performed in parallel and/or in a different sequence.

When the system is started up, a system clock provides the clocking signals (i.e., clocks) required for proper system operation. As described hereinafter, the clock circuitry/logic 256 (FIG. 3) monitors the operation of the normal system clock source and provides a clock fail output when the normal system clock source fails, step 102. The system clock monitoring function is begun at power-up and continues during all modes of system operation until the system is powered off.

In a preferred embodiment, the computer system includes redundant or back up clock circuitry/logic so the computer system can withstand a single system clock failure. Thus, if a failure of the normal system clock source is identified, the computer system automatically redesignates the redundant clock circuitry as being the designated source for system clocks, step 104. It should be noted that the failure of the clock circuitry/logic 256 on the slot 0 motherboard, does not automatically require the slot 0 motherboard to be functionally deconfigured from the system. Because a loss of the system clock is an irretrievable failure, the computer system automatically returns to the beginning of the diagnostic testing process. For purposes of the present invention, such an automatic re-start of the system will be referred to as a cold reset of the system. However, this cold reset does not involve removing and re-establishing power to the system.

Assuming that no other system faults are discovered during the cold reset power up process, as described below, the operating system will be automatically booted and re-invoked. Also, as part of the system start up process, messages are sent to the user and local service center regarding the clock failure. In sum, the above described clock failover process is performed automatically by the system without requiring the user to intervene and switch the clocks.

When the above initial power-up process is completed, the computer system is released to perform a number of diagnostic testing and evaluation operations. These operations check out various components (e.g., chips, boards, buses) to verify the integrity and operability of the computer system prior to the loading of applications (e.g., the operating system). In a preferred embodiment, the computer system is designed to include integrated JTAG test circuitry/logic and scan chains so the diagnostic testing and evaluation can be automatically performed by the system.

Specifically, the computer system checks for electrical continuity (i.e checks for shorts and opens) at the board and chip level, step 110. In addition to the continuity checks, the computer performs functionality checks, e.g., to identify a hard stuck, step 112. All components identified as being faulted are so tagged.

If there are faulted components (YES, step 114), then the computer system attempts to de-configure the faulted components so they are not logical or operationally functional components of the computer system, step 116. The computer system as a practical matter should not de-configure itself below the minimum number of components required for system operation. For example, the system cannot functionally remove the last system board. If de-configuration of the computer system is not possible (NO), then the system shuts itself down, step 118.

If the computer system can be de-configured (YES, step 116), then the computer system takes the necessary actions required to remove the faulted component, functionally and operationally, from the system, step 120. The computer system preferably operates so fault isolation is at least to the FRU which failed or to the FRU on which the component believed to be faulted is located. Isolation to the FRU makes the diagnosis and fault isolation process accurate, fast and complete. The system also updates a system memory chip (e.g., EEPROM) to identify the active and de-configured components including a failed system clock.

After de-configuration is completed, the process and computer system returns to re-performing the diagnostic tests, steps 110–114. Thus, the operability and integrity of the de-configured system is verified prior to loading of the applications. The diagnostic testing and evaluation process is repeated until there are no faults identified or a system shutdown is required.

If no further faults are detected, or if there was no fault detected in the initial diagnostic tests (NO, step 114), then the system proceeds to load the operating system, step 122. If the operating system is successfully loaded (YES, step 124), then the computer system is available for use, namely to load and run the applications program(s) of the user(s), step 126.

As provided in the following, the system outputs a message about deconfigurement or shutdown to the user and, preferably, to the appropriate service center. This includes advising of a failed system clock (i.e., loss of redundancy). In this way, the service center and user are informed of the failure. Also, this allows the user and service center to schedule the replacement of the component at a time that is convenient for the user.

While the applications program(s) is being run, the computer system is monitoring for errors that may be representative of the presence of a faulted component(s). If no errors are detected (NO, step 128), then the user continues to run the applications program. If an error is detected (YES, step 128), then the operating system and/or the computer system determines if the error is fatal or non-fatal, step 130.

Non-fatal errors are those errors that do not result in an immediate shutdown of the computer system and/or irretrievable corruption of information, data or state. An example of a non-fatal error is a single bit error. Fatal errors on the other hand are those errors that indicate the potential failure of component which would cause a system shutdown, those where the program running has crashed or hung or a failure in which there is a corruption of information, data or state. An example, of a fatal error is when the watch dog timer for a given operation/component times out indicating a hung condition.

If the error is determined to be fatal (YES), then the computer system is put in a condition to save computer system information such as that found in the system's memory and in component buffers/registers, step 150. As discussed below, the board mounted ASICs include registers for storing state or bus transaction information. Also, the ASICs are in general configured to maintain their state when a fatal error is detected. However, saving this information does not require the system clocks to be frozen as is required with a number of prior art suggested techniques. In this way, the system automatically saves information that can be later used, e.g., in the manufacturing/repair facility, to identify the failed component/failure cause.

After placing the system in its save information condition, the computer system retrieves the information concerning the state of the system step 152. Preferably, this is accomplished using the integrated JTAG test logic/circuitry and scan chains to scan the information out of the various registers/buffers and ASICs Flip/Flops (F/Fs) in the system. After retrieving the information, a warm reset is asserted, step 154.

The computer system/operating system, where possible, also take those actions that can resolve the identified error so the computer system may be re-started by the warm reset for the purpose of retrieving the memory's contents. As such, if the warm reset is successful (YES, step 156), then the computer system causes the memory to be dumped and saved, e.g., in the system's hard drive. After completing the memory dump, or if the system faults again after assertion of the warm reset (YES, step 156), then the process returns to performing the system diagnostic evaluation process, step 102 (i.e., a cold reset asserted). Thus, before system operation is continued, computer system integrity and operability is again verified.

If the error is non-fatal (NO, step 130) then the computer system/operating system takes the necessary actions to correct or resolve the initially identified error, step 132. For example, re-obtaining/re-writing the data involved in the single bit error. For some non-fatal errors, the computer system/operating system, as part of this process, also determines if the occurrence of non-fatal errors has exceeded a threshold criteria. If yes, then a notation is made so the component or related FRU is de-configured during the next power-up or cold reset of the system. For example, if the single bit errors for a given SIMM exceed the threshold limit, then the SIMM is tagged for later de-configurement. The operation of the computer system and the running of user applications program is continued (i.e., computer system not shutdown).

Figure 2:
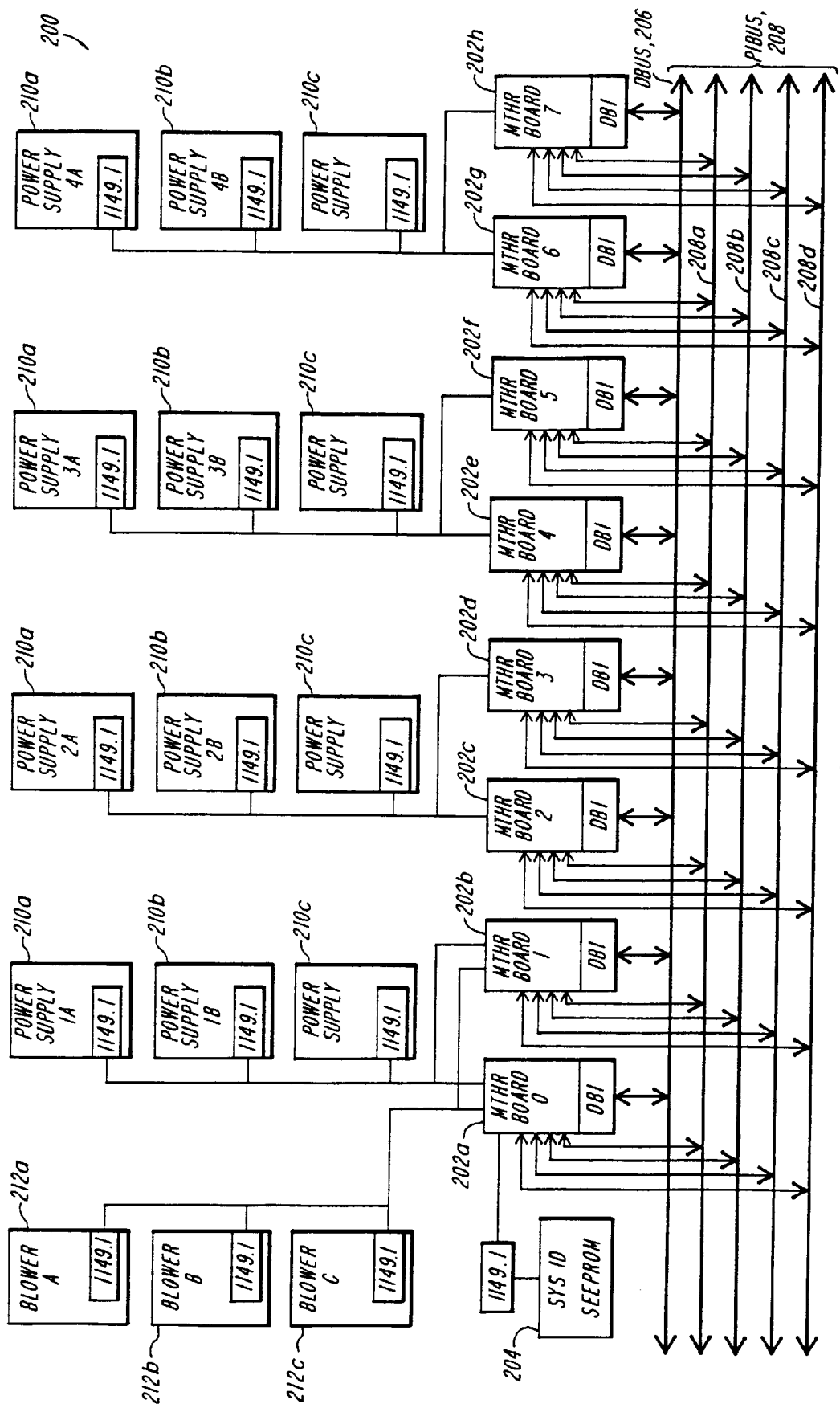
FIG. 2 is a high level block diagram of the high availability computer system of the instant invention.

There is shown in FIG. 2 a high level block diagram of the high availability multi-processor computer system 200 of the instant invention. The multi-processor computer system 200 of the instant invention preferably employs a CC-NUMA architecture as described in U.S. Pat. No. 5,887, 146 the teachings of which are incorporated herein by reference. The multi-processor computer system 200 includes a plurality of board complexes or motherboards 202a–h that are each interconnected to the four busses 208a–d that make up the PI BUS 208. The PI BUS 208 is the bus traversing the backplane and interconnecting all the motherboards of the system. The four busses 208a–d allow information, data and instructions to be communicated among and between the motherboards. Each motherboard 202 also includes a diagnostic bus interface (DBI) 204 that interconnects each motherboard to the diagnostic bus (DBUS) 206. While the illustrated computer system includes 8 motherboards 202a–h, this is not a limitation as the system can be configured with at least two motherboards.

Figure 3:
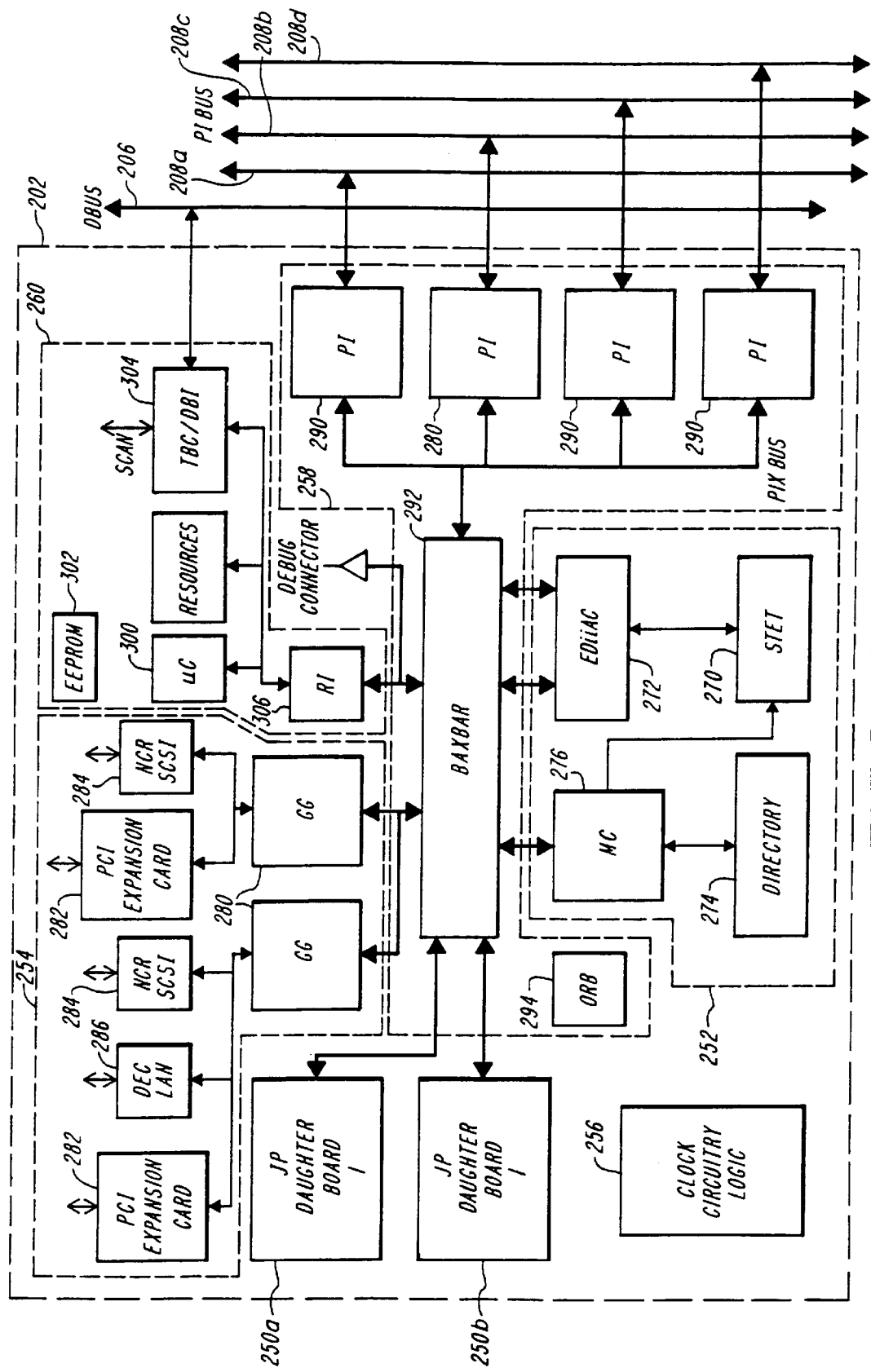
FIG. 3 is a block diagram of a motherboard for the computer system of FIG. 2.

Referring also to FIG. 3, a block diagram of a motherboard, each motherboard 202 includes two job processor (JP) daughter boards 250a,b that are plugged into the motherboard; a memory subsystem 252, an I/O subsystem 254, clock circuitry/logic 256, a bus/PIBUS interface subsystem 258, and local resources 260. The clock circuitry 256 included with the motherboards at slot 0 normally generates and selectively provides system and test clocks to the motherboards in all backplane positions/slots. The clock circuitry/logic 256, including its distribution, is discussed further below in connection with FIGS. 9–11. Similarly, the job processor daughter boards 250a,b will be discussed below in connection with FIG. 4.

The memory subsystem 252 on each motherboard 202 includes a plurality of SIMMs 270, two Error Detection and Correction Unit ASICs (EDiiAC) 272, a directory 274 and a memory controller ASIC (MC) 276. The memory subsystem 252 is capable of providing up to 512 MB of system memory on each motherboard 202 for the computer system 200. Actual random access memory storage is provided by up to eight (8) 16 M×36 standard SIMMs 270 provided on the motherboard 202. The motherboard 202, however, can be populated with 4 or 8 SIMMs. Memory data is protected using ECC which is generated/corrected using the two EDiiAC ASICs 272. Each EDiiAC provides a 64 bit data path and the two are used to interleave with a cache block.

The memory subsystem 252 also includes a storage for the directory 274 which is used to maintain cache coherency. The directory 274 includes 4 M×4 dynamic random access memories that are mounted to the motherboard 202. The ECC codes for both the directory and the main data store (i.e., the SIMMs 270) are capable of correcting all single-bit errors and detecting all double-bit errors.

The MC ASIC 276 controls the execution of physical memory operations. This involves managing both the directory 274, which maintains system coherency, and the memory data store SIMMs 270. The MC ASIC 276 processes memory transaction packets that are driven onto the MCBUS by the BAXBAR 292.

The I/O subsystem 254 on each motherboard 202 includes two I/O subsystem interface ASICs (GG) 280, two Peripheral Component Interface (PCI) expansion cards 282, two Small Computer System Interfaces (SCSI) 284, and one Local Area Network (LAN) interface 286. Each of which are mounted to the motherboard 202.

The I/O subsystem 254 of each motherboard 202 comprises two independent PCI channels operating at 25 MHz. Each PCI channel is interfaced to the GG bus of the bus/bus interface subsystem 258 by means of a GG ASIC 280. Each GG 280 contains an integrated cache for I/O transfers and also contains all the necessary logic to provide the interface between the GG bus and the PCI bus, including PCI arbitration. The GG 280 also serves as a gatherer of interrupts from the motherboard and connected peripherals and combines these interrupts and directs them to the appropriate job processor (JP) on a JP daughter board 250a,b by means of a bus packet.

Each of the two PCI busses is connected to an integrated SCSI interface 284 and to a single PCI expansion board 282. One of the two PCI busses also is connected to an integrated 10 Mb LAN interface 286. The two SCSI interfaces are implemented using an NCR825 Integrated PCI-SCSI controller as a pair of Wide Differential SCSI-2 interfaces. Each controller is connected through a set of differential transceivers to the 68 pin High Density SCSI connector on the airdam. No onboard termination of the SCSI bus is provided allowing the connection of the motherboard 202 into Multi-initiator or other SCSI cluster configurations. The single LAN connection is made using the DECchip 21040 PCI-Ethernet controller. This provides a single chip integrated LAN which is connected to an RJ-45 connector on the airdam.

The bus/PIBUS interface subsystem 258 on each motherboard 202 includes four PIBUS interface ASICS (PI) 290, a crossbar switch (BAXBAR) 292 that serves as the interconnect path for the motherboard level busses, an arbitration ASIC (ORB) 294 and a plurality of board level busses. The ORB ASIC 254 controls arbitration for the motherboard level buses and controls the BAXBAR bus transceiver. The BAXBAR (BB) 292 is implemented as four ASICS and includes a mode switch to select between the ORB ASIC functions and the BAXBAR ASIC functions.

The primary communication between job processors across the backpanel is accomplished using the PIBUS Interface portion of the bus/PIBUS Interface subsystem 258. A single PIBUS 208a consists of a multiplexed 72-bit Address-CTRL/Data bus and associated arbitration and control signals. Each motherboard 202 includes 4 identical PIs 280, where each PI is interconnected to one of buses 208a making up the PIBUS 208. Traffic is partitioned across the four busses 208a–d, so that each bus is approximately equally utilized.

As indicated above, the subsystem 258 includes a plurality of board level buses. The following lists each of the individual busses and includes a brief description for each.

RI bus: Bus that interconnects the BAXBAR 292 to the Resources Interface ASIC (RI) 306 and to the debug buffers/debug connector.

GG bus: Bus that interconnects the BAXBAR 292 to the two GG ASICs 280.

MC Bus: Bus that interconnects the BAXBAR 292 to the MC ASIC 276.

$CI_0$ Bus: Bus that interconnects the BAXBAR 292 to the Cache Interface ASIC (CI) 414 that is mounted on the $JP_0$ daughterboard 250a.

$CI_1$ Bus: Bus that interconnects the BAXBAR 292 to the Cache Interface ASIC (CI) 414 that is mounted on the $JP_1$ daughterboard 250b.

PIX Bus: Bus that interconnects the BAXBAR 292 to the four PI ASICs 290.

MUD L, MUD H Bus: The two busses that interconnect the BAXBAR 292 to the two EDiiAC ASICs 272 of the memory subsystem.

Each motherboard 202 contains all the local resources that are required of the system, with the exception of the System ID PROM 204, which is contained on the backpanel. The local resources 260 includes a microcontroller (uC) 300, EEPROMs 302, SRAM, NOVRAM, DUARTs, SCAN interface logic 304, MACH logic, and a Resources Interface (RI) ASIC 306. Although the local resources 260 is duplicated on each motherboard 202, the computer system 200 only uses the local resources section of the board in either slot 0 or slot 1 on the backplane as the system wide Global Resources. The RI ASIC 306 provides the interface between the RI Bus/BAXBAR 292 and the devices within the local resources 260.

The microcontroller 300 performs low-level early power-up diagnostics of the system prior to de-asserting RESET to the JPs on the JP daughterboards 250a,b. It also is the controller/engine used for all scan operations. If a JP 400a,b on a daughterboard 250a needs to do a scan operation, it makes a request to the micro-controller 300 which then performs the required operation. Scan also is used to configure the ASICs during power up, communicate with the power supplies and blowers, communicate with the various ID PROMs within the system, and to dump failure information after a hardware fatal error.

There are four 512Kx8 EEPROMs 302 that store all the JP 400a,b and microcontroller 300 firmware. The EEPROMs 302 also contain the appropriate test vectors for performing JTAG scan tests during power-up. A 512Kx8 SRAM is included in the local resources 260 to be used as scratchpad RAM for early power-up and for microcontroller stack space. A 128Kx8 NOVRAM/RTC is also provided to give an extra area for storing critical information in non-volatile storage and to provide a real-time clock for the system.

The local resources 260 provides the DUARTs for implementing the three required UART ports for the system. The fourth UART port also is used as part of a loopback circuit to allow a JP to monitor what is being driven on the main system console.

In addition, the local resources section 260 also provides the logic 304 to do JTAG based scanning of all the board mounted ASICs, the power supplies, the blowers, the SEEPROM and SYSID PROM. The logic is in place to allow the system to be scanned either during manufacturing test using an external tester or during normal operation/ power-up using the microcontroller 300 on the motherboard 202. This logic allows simple boundary scan testing to be used as part of the power-up system testing to detect and isolate possible faulty components (e.g., FRUs).

Additionally, the MACHs on the resource bus can be programmed using its JTAG interface from an external connector. Also, the microcontroller can be used with an external connector to program the EEPROMs on the resource bus. This allows manufacturing to assemble the boards with blank MACHs and EEPROMs and then "burn" them as part of the test procedure, rather than stocking "burned" versions of the parts to be installed during assembly. This "incircuit programmability" feature also makes updates for ECO activity as simple as plugging in the programming connector and re-programming the parts, rather than removing the old part and installing a new part in its place.

Referring back to FIG. 2, the computer system 200 also includes a group of three power supplies 210a–c for each pair of motherboards 202, three blowers 212 that cool the system, and a system ID SEEPROM 204. When there are eight motherboards 202, there is a total of 12 power supplies. The three power supplies 210a–c in each group represents N+1 redundant power supplies for the pair of motherboards. Also, the three blowers 212 represent N+1 redundant blowers for the system 200.

The power supplies 210a–c for each group also are interconnected to each motherboard 202 of the corresponding pair of motherboards. In this way, and as described below, each motherboard 202 has the capability to ascertain (e.g., scan, diagnose) the operability status of the power supplies for that pair of motherboards. The blowers 212 also are interconnected to the motherboards 202 in slots 0 and 1 on the backplane. In this way, and as described below, the motherboards 202 in these slots have the capability to ascertain (e.g., scan, diagnose) the operability status of the blowers 212.

The System ID SEEPROM 204 provides a non-volatile place to store important system information such as serial number and back panel configuration. Because the System ID SEEPROM 204 does not have a true JTAG interface, it cannot be connected directly to a IEEE 1149.1 scan chain (see discussion below). Thus, a buffer is used to provide the interface between the two serial protocols.

Figure 4:
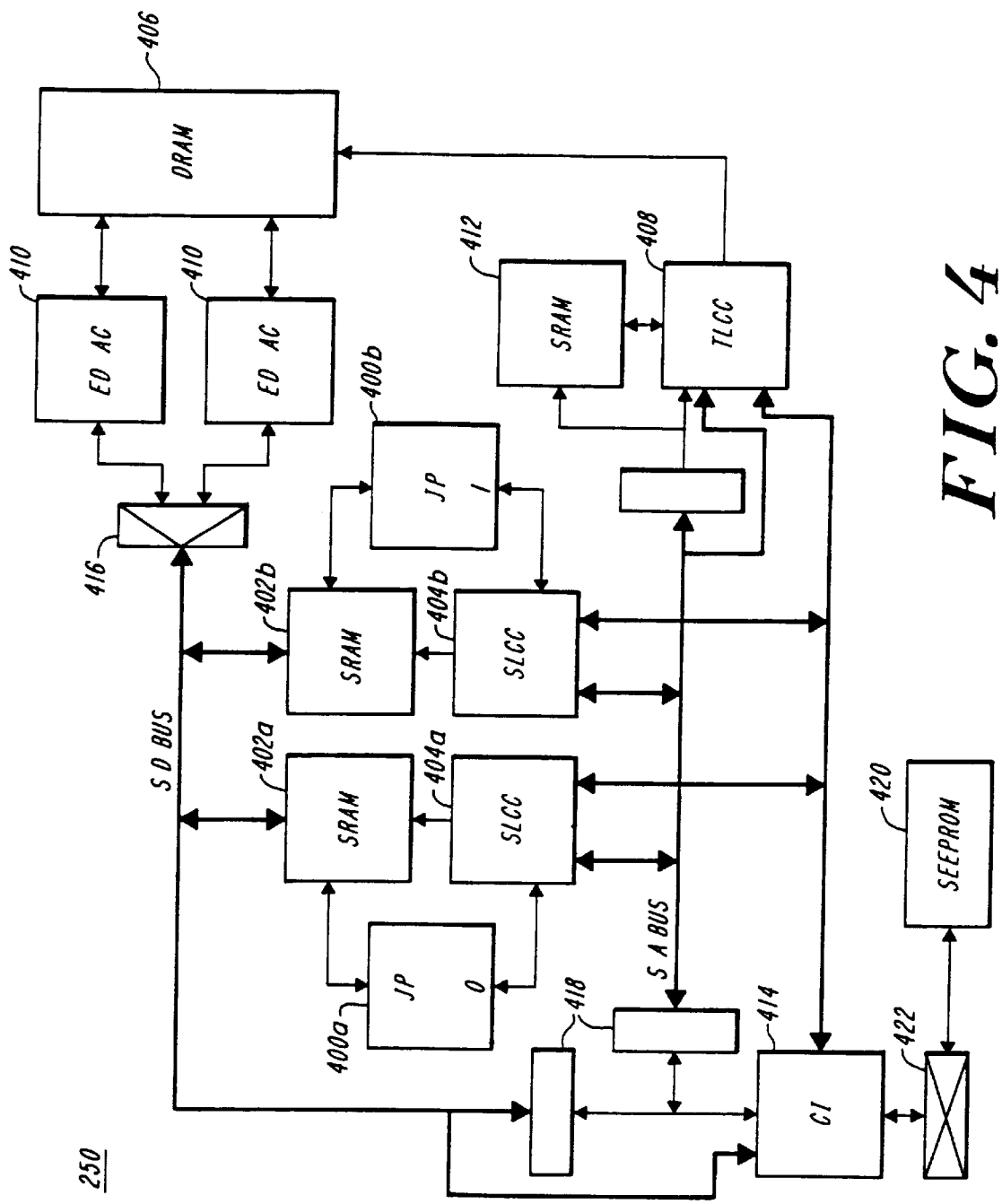
FIG. 4 is a block diagram of one daughter board for the motherboard of FIG. 3.

Referring to FIG. 4, there is shown an exemplary block diagram for a JP processor daughter board 250. Each JP daughter board includes two 50 MHz Motorola 88110 central processing units or job processors (JPs) 400a,b, each JP having associated therewith 1 MB of static random access memory (SRAM) as a level 2 cache 402a,b and a 88410 cache controller (SLCC) 404a,b. Also mounted on each daughter board 250 is 16 MB of dynamic random access memory (DRAM), a third level cache (TLC) 406 and a third level cache controller (TLCC) ASIC 408 which controls the TLC. The third level cache 408 is shared by both JPs 400a,b. The DRAMS are protected by ECC, which is generated and checked by two EDiiAC ASICS 410 that are under the control of the TLCC ASIC 408. The cache tags for the third level cache 406 are stored in a SRAM 412.

Each JP daughter board 250 also includes a Cache Interface (CI) ASIC 414. The main function of the CI ASIC 414 is to serve as a translation/sequencer between the packet-switched local bus protocol on the motherboard 202 and the 88410 cache controller bus protocol on the JP daughter board 250. All off JP daughter board communications, with the exception of clocks and reset, are part of the motherboard level buses and the CI is directly connected to the CIBUS.

The two EDiiAC ASICs 410 are interconnected to the daughter board level buses via six ABT16260 latching 2:1 muxes 416. For purposes of multiplexing, the 32 bit S A Bus and the 32 bit S D Bus are multiplexed into the S AD bus by means of four LVT162245 bus crossovers 418.

Each daughter board 250 includes a SEEPROM 420 that provides a non-volatile place to store important daughter board information such as the board number, serial number and revision history. Because the SEEPROM 420 does not have a true JTAG interface, a buffer 422 is used to provide the interface between the two serial protocols.

Figure 5:
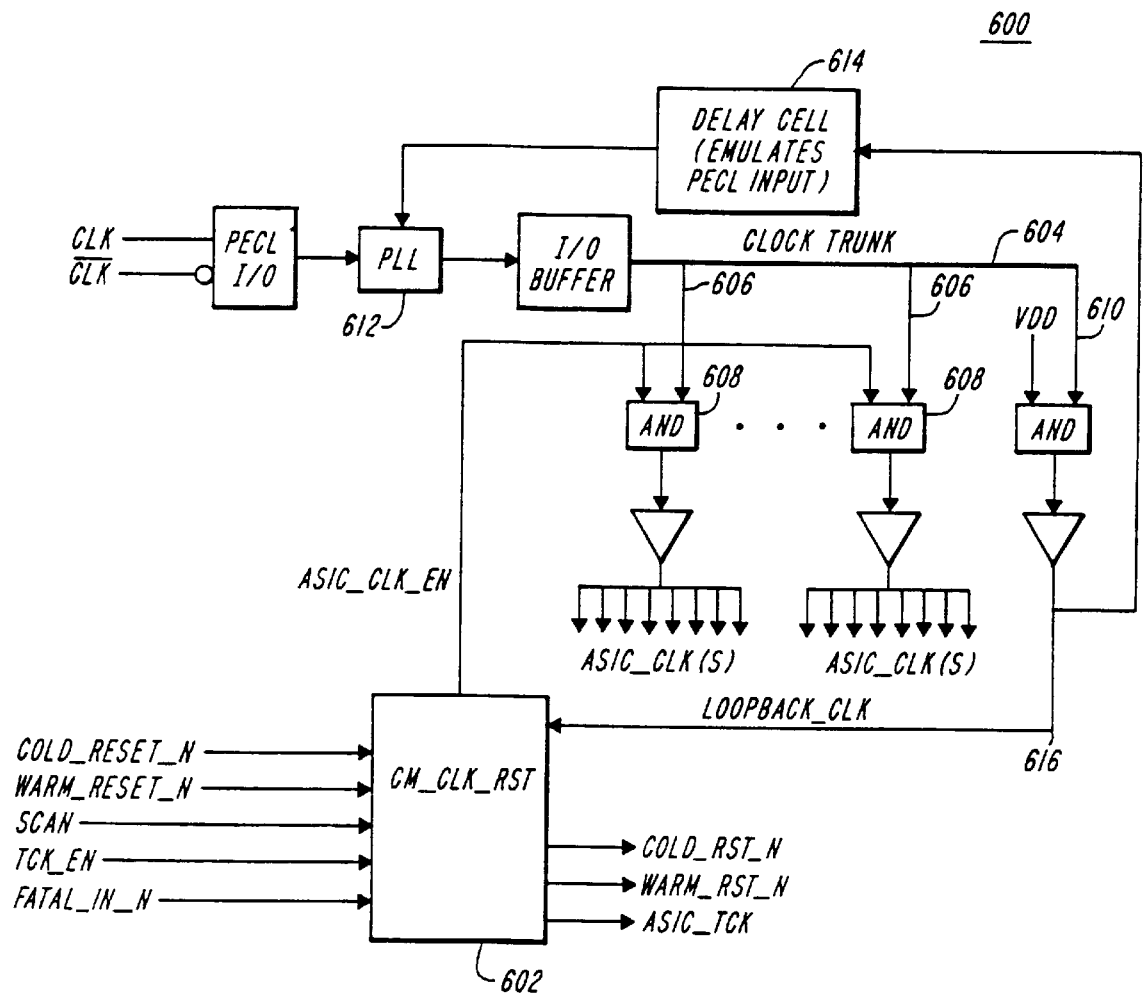
FIG. 5 is a block diagram of the PLL gated balanced clock tree for an ASIC of the instant invention.
Figure 6:
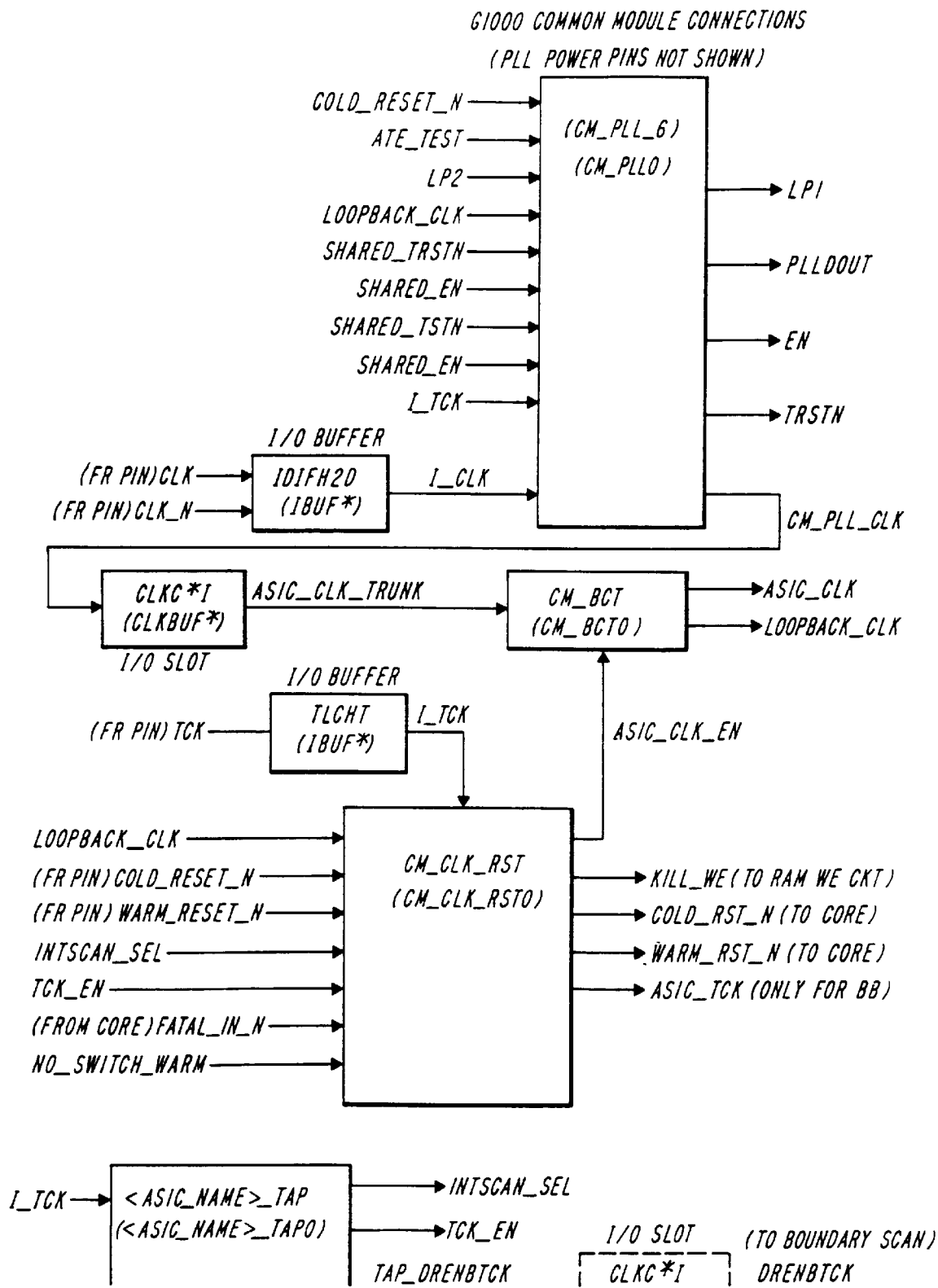
FIG. 6 is a hierarchial depiction of the BCT.

Each of the above described ASICs uses a Phase Locked Loop (PLL) based "gated" balanced clock tree (BCT) design, as shown in FIG. 5. ASIC clock control is handled by the Test Access Port (TAP) module and ASIC Clock/Reset (CLK RST) module 602 of each board mounted ASIC. The BCT circuitry/logic 600 includes a clock trunk 604 that has a plurality of branches therefrom. All but one of these is a gated branch 606 that includes an AND gate 608 which is controlled by the enable function ASIC_CLK_EN from the CLK RST Module. FIG. 6 illustrates how the BCT is connected in the ASIC hierarchy (G1OOO level).

The uncontrolled branch 610 is a "free running" leg of the clock tree and it provides a delayed clock input to the PLL 612 for clock deskewing. The clocks being inputted to the PLL 612 are passed through a delay cell 614, that adjust the feedback clocks so they are representative of the travel time delay through a set branch length. Preferably, the delay cell 614 is configured/set so the expected travel times or branch line lengths for the longest and shortest branches lies within the acceptable range for the set branch length/time. As such, the PLL feedback path is always active so the PLL 612 can stay in synch with the ASIC's reference clock input CLK. The uncontrolled branch also feeds a LOOPBACK_CLK 616 to the Clock Reset (CLK RST) module 602 that is used for synchronization of the Test clocks (TCK).

Figure 7:
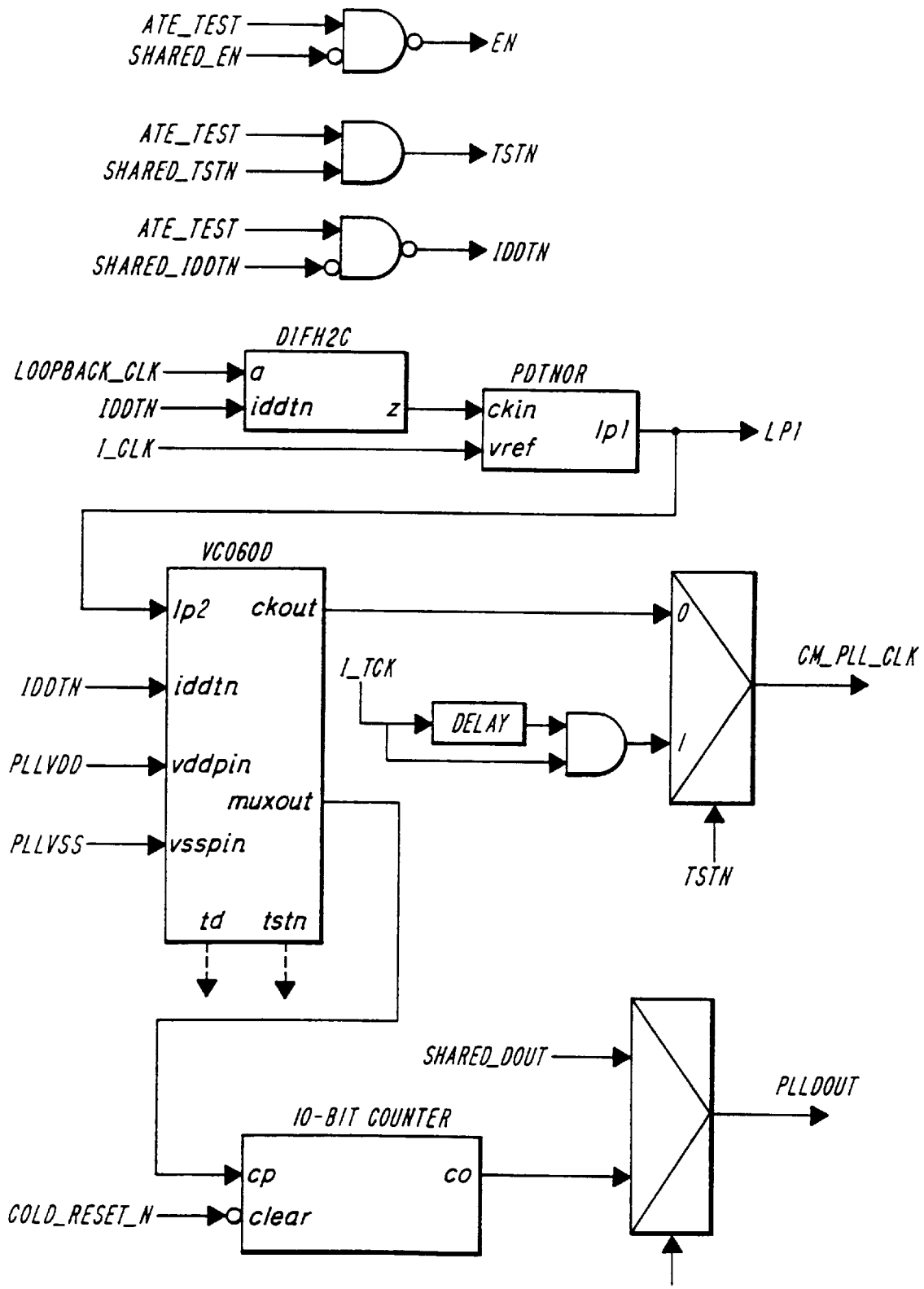
FIG. 7 is a block diagram of the PLL module of an ASIC according to the instant invention.

The PLL module, as shown in FIG. 7, is a common module for all system ASICs that use the above described BCT ASIC design. The ATE_TEST input is used to control test modes for the VCO logic. The EN, TSTN and IDDTN signals need to be controlled at the ASIC pin level during manufacturing package testing so all PLL based ASICs provide these pins discretely or share this pin with some other input pins. This saves on pin count. The ATE_TEST input pin is used to enable shared pins pin level control of these signals. For example, the P1 shares the EN function with the PI_ORDERED_OP input and the IDDTN function with the PI_MED_CUSTOMER input.

Figure 8:
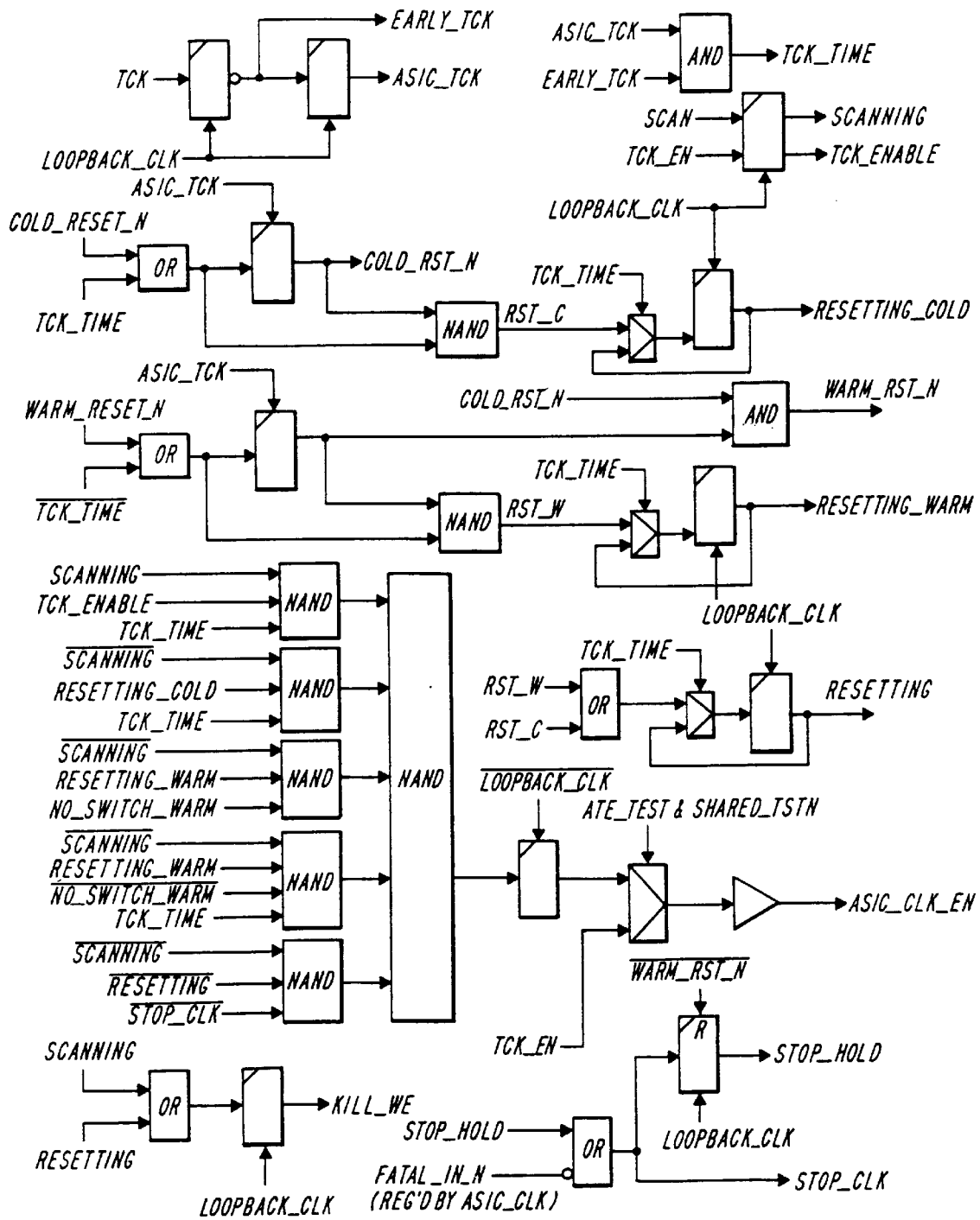
FIG. 8 is a block diagram of the circuitry/logic for the ASIC internal reset and clock generation.

The ASIC Clock/Reset (CLK RST) module 602 generates the ASIC internal reset and clock signals as well as the enable function (ASIC_CLK_EN) which causes the F/Fs in the ASIC design to see only certain clock pulses. There is shown in FIG. 8, a block diagram of the circuitry/logic for ASIC internal reset and clock generation. The CLK RST module 602 for each ASIC operates in one of three modes; Normal Mode, Scan Mode and Reset Mode. If not in one of these three Modes, then the CLK RST module generally acts so as to mask out or block the clocks from reaching the F/Fs in the gated branches 606.

In the Normal Mode, the CLK RST module 602 continuously generates the ASIC_CLK_EN enabling function. Thus, the AND gates 608 in the gated branches 606 of the BCT are configured so the clocks pass therethrough. If a FATAL_IN_N is asserted by the computer system 200, then the gates 608 for all board mounted ASICs, except for the MC ASIC 276 (FIG. 3), are re-configured so as to block or mask out the clocks. Essentially, the ASIC_CLK is free-running until the ASIC experiences an assertion of FATAL_IN_N. The clocks remain blocked/masked out until the Scan Mode or Reset Mode is entered.

In the Scan Mode, the JTAG TAP controls the ASIC clocks. ASIC_CLK is allowed to pulse once every 80 nano seconds (nsec.), but only if the TCK_EN enable signal is asserted from the TAP. The Scan Mode overrides Reset Mode or Normal Mode. When in Reset Mode, the ASIC_CLK also is allowed to pulse once every 80 nsec. This allows the board mounted ASICS to be synchronized and reset all at the same time. The Reset Mode overrides the Normal Mode.

When either the reset or scan inputs to the CLK RST module 602 is asserted, the clocks generally are switched from the normal system clocks (SYS CLK), e.g., the 50 MHz clocks, to the test clocks (TCK), e.g., the 12.5 MHz clocks. However, for the MC ASIC 276, only a COLD_RESET_N will switch the clocks; WARM_RESET_N will be registered on TCK mode and is expected to make setup to all flops in one 20 nsec cycle.

The clock enable is generated such that the ASIC_CLK will switch from SYS CLK to TCK at the end of the TCK cycle in which the external reset is asserted. The internal reset signals will not assert until two TCK cycles after the external reset asserts. When the external reset is deasserted, the internal reset deasserts two TCK cycles later.

The TCK_EN is used for scan functionality. It must be asserted in order to pass TCK through the clock gating logic. TCK_EN is generated in the TAP controller.

As such, there are three basic modes of clock operation that affect the internal flip/flop (F/F) clocks. The first mode is where all of the logical F/F clocks are synchronized to the CLk/CLK_N input clocks phase using the on chip Voltage Controlled Oscillator (VCO) in the CM_PLL module. The second mode is where the internal F/F clocks are stopped on detection of an error detected via X_FATAL_IN_N input pin. This is done for all board mounted ASICs except the MC ASIC 275 (FIG. 3). The last mode is where a particular TAP instruction is loaded into the TAP instruction register and results in the internal F/F clocks being clocked in phase with the TCK input pin when the TAP controller is in the "Capture-DR" and "Shift-DR" TAP states. This last mode of operation is used to scan initialize or scan dump the ASIC state.

In sum, the "free running" running leg of the clock tree allows the internal F/F clocks to be stopped on detection of a fatal error while keeping the system clocks running and the PLL maintained in synch with the ASIC's reference clock input CLK. As such, when an ASIC is being scan dumped for its state, the ASIC clocks will be in sync with the clocks of the computer system. This is in comparison to known BCT designs where such a clock stop/restart would require the PLL to re-sync itself and thus prevent scan dumping of the ASIC state. Such a design also allows the system clock to continue providing clock signals to the other components of the computer system (e.g., microcontroller 300- FIG. 3) particularly those that are used for scanning and diagnosing of the computer system following receipt of a fatal error as hereinafter described.

As indicated above, the internal F/F clocks of the MC ASIC 276 (FIG. 3) are not stopped by a X_FATAL_IN_N input. This is done because stopping the internal F/F clocks would destroy the memory image being stored on the motherboard 202 (i.e., interfere with memory refresh). The memory image is maintained so the core can be dumped which is required for operating system (i.e., DG/UX) debug. The MC ASIC 276 does support a mode where the internal F/F clocks can be stopped for lab debugging.

On receipt of an X_FATAL_IN_N input representative of the detection of a fatal error somewhere in the system, the MC ASIC 276 will abort the current operation and will remain idle except for refreshing the memory (i.e.,DRAMs/SIMMs). The MC ASIC's input and output queues are cleared and some internal state machines are reset to idle. The MC ASIC will not respond to any bus activity until it receives a warm reset. After the warm reset, the MC ASIC's control-space registers can be read to get error information that was saved when the fatal error was detected.

Because the MC ASIC 276 cannot be scanned to collect information about a fatal error, it freezes copies of some of its current state into shadow registers when a fatal error occurs. Shadow registers are copies only and freezing them does not affect normal ASIC behavior. Many of these shadow registers are control space accessible. The information in the shadow registers remains valid through a warm reset and will not change until after the error registers have been cleared by specific control space writes. The other ASICs on the motherboard 202 and the daughter boards 250*a,b* also include shadow registers for freeze copying some state information therein.

When a fatal error originates at the MC ASIC 276, the MC ASIC immediately freezes shadow copies of internal state relating to the operation currently being executed. This allows state to be captured before it advances without using several levels of shadow registers. Shadow registers containing less volatile state are not frozen until the MC ASIC generated fatal error is sent back to the MC ASIC as a system fatal error.

As indicated above, and for purposes of maintaining a high level of availability, the computer system 200 of the instant invention includes redundant system clock circuitry/logic. Preferably, the clock circuitry/logic 256 generates the system clocks and test clocks, monitors the clocks being generated to identify a failure of the clock generation and distribution circuitry and is provided on each motherboard 202. Such circuitry and logic is provided on each motherboard 202 at least to simplify manufacturing and the stocking of spares. In a specific embodiment, the computer system and test clocks are sourced to the clock circuitry/logic 256 on one of the motherboards in backplane slots 0 and 1. In this arrangement, circuitry/logic on the motherboard in slot 0 normally sources the system and test clocks and the circuitry/logic on the motherboard in slot 1 is the backup clock source.

Figure 9:
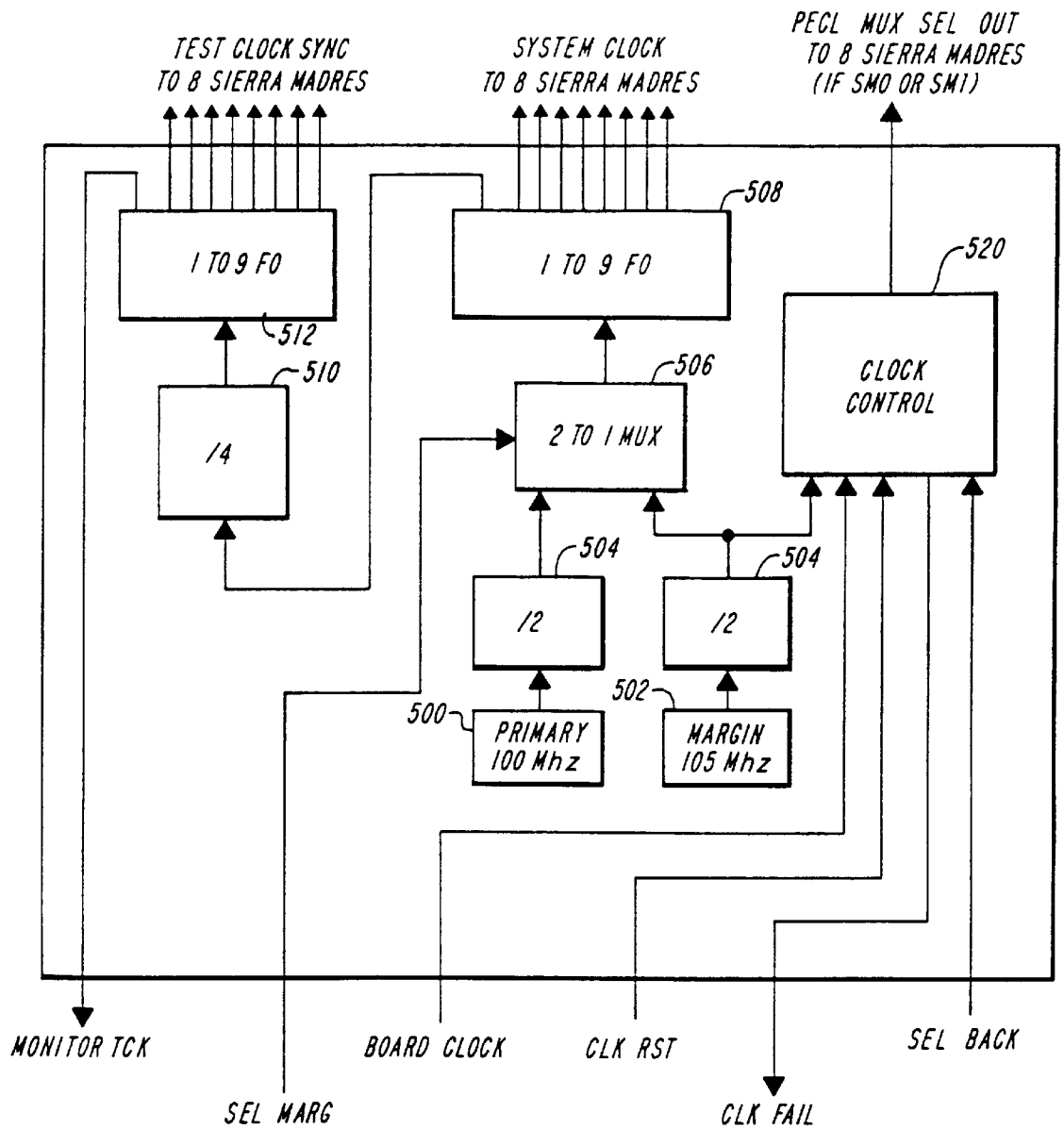
FIG. 9 is a block diagram of the clock generation and detection circuitry/logic of the instant invention.
Figure 10:
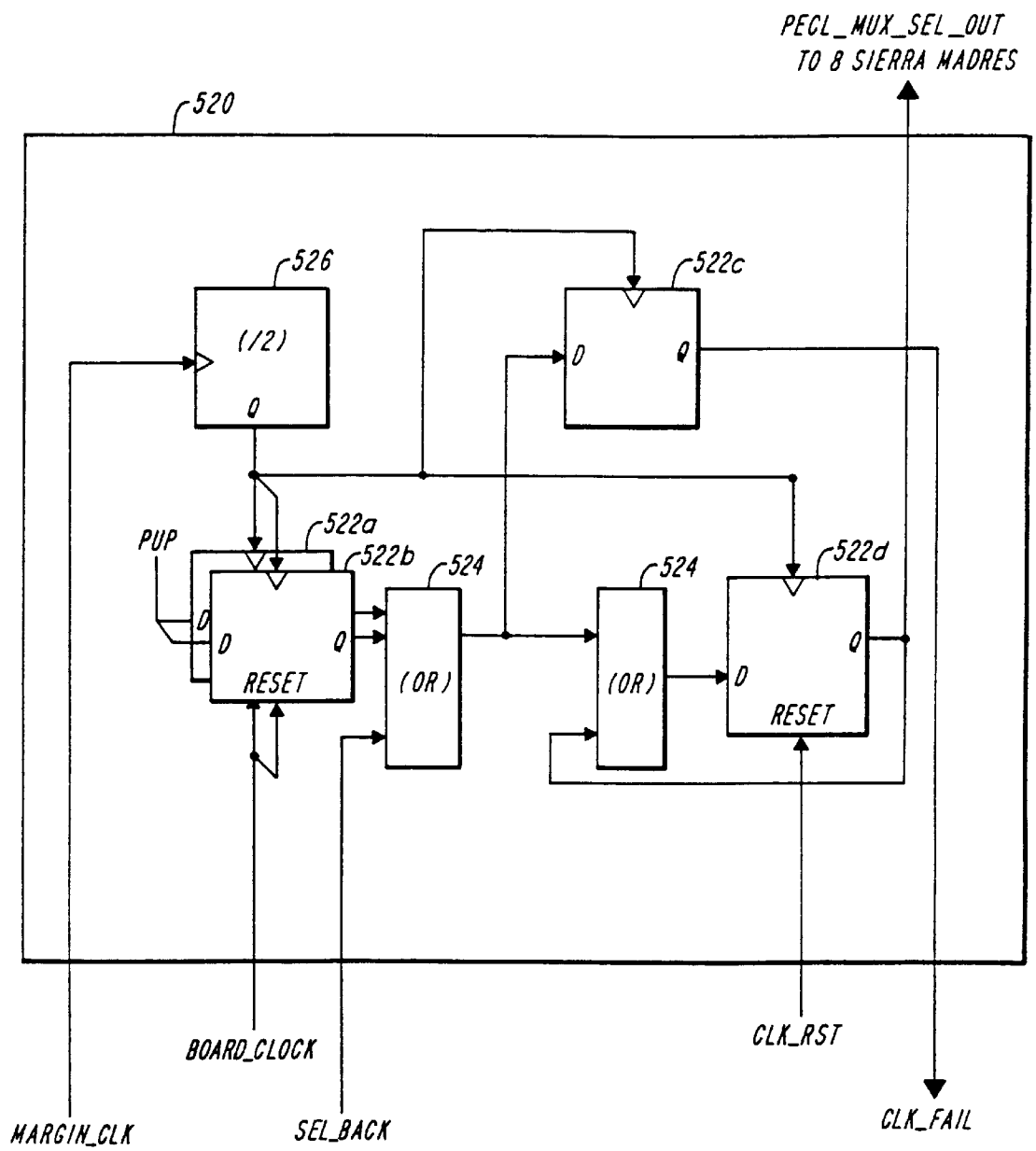
FIG. 10 is a block diagram of the clock failure detection circuitry.
Figure 11:
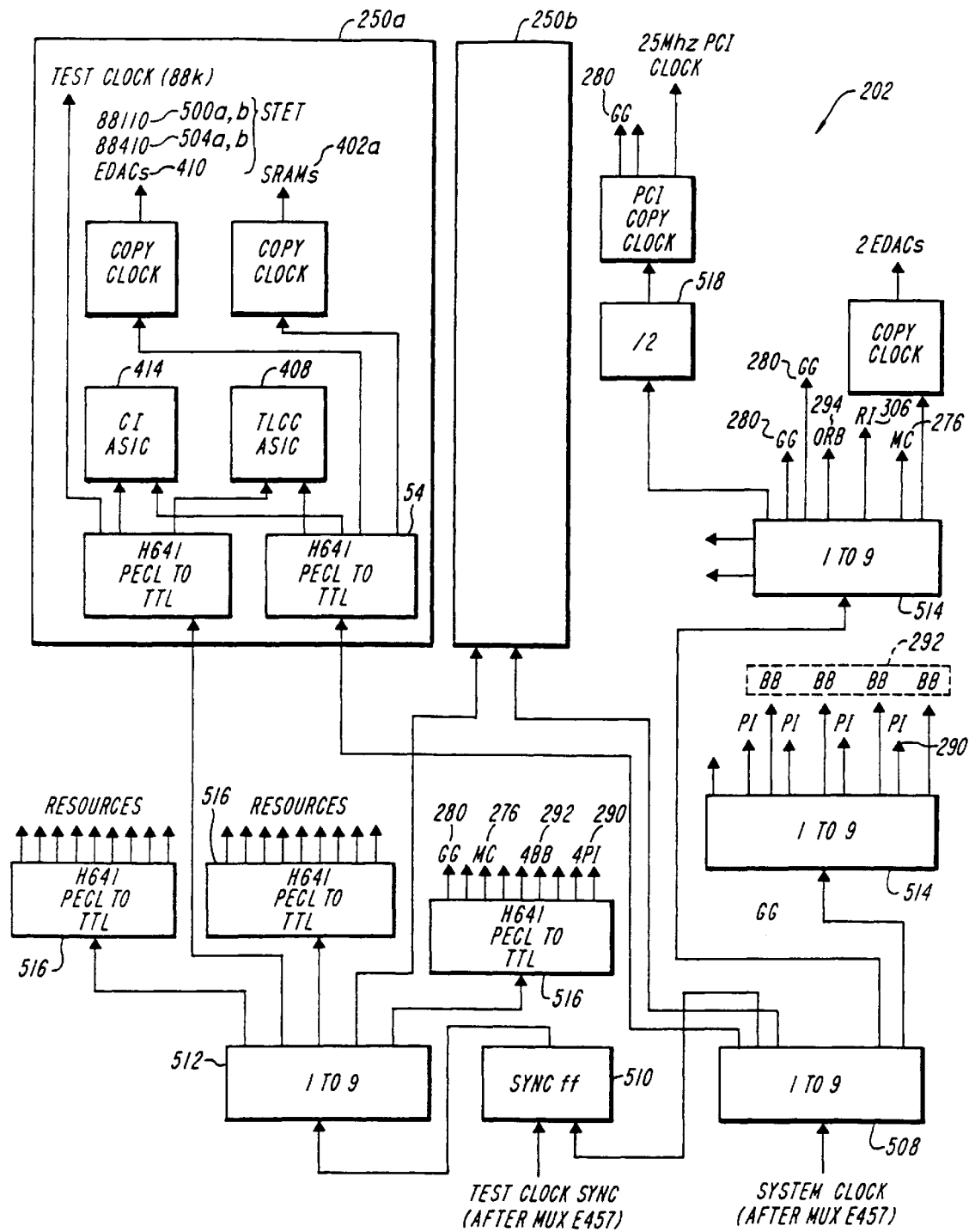
FIG. 11 is an exemplary block diagram of the distribution of clocks to the motherboard and daughter boards.

There is shown in FIGS. 9–10, the clock circuitry and logic that generates the system and test clocks as well as monitoring the clocks being generated to detect a failure. The manner in which these clocks are distributed to a motherboard 202 and its JP daughter boards 250*a,b* is shown in FIG. 11.

The clock circuitry/logic 256 includes two oscillators. The primary oscillator 500 is for the normal clocks and in a specific embodiment is a 100 MHz crystal. The other oscillator, the margin oscillator 502, provides a 5% fast margin feature and in a specific embodiment is a 105 MHz crystal. Each of the oscillators 500,502 drives a divide by two circuit 504 to generate a 50% duty cycle clock (e.g., 50 MHz and 55 MHz clocks). The outputs of the divide by two circuits 504 are inputed to a two to one mux 506, which is preferably configured so its output is the normal clocks (e.g., 50 MHz clocks). However, the two to one mux 506 does allow the clocks to be sourced by the margin crystal 502.

The clocks from the two to one mux 506, the system clocks, are provided to an E111 one to nine clock fanout circuit 508. One output from the one to nine fanout circuit 508 is feed to an E431 divide by four circuit 510 that is driven to form the test clocks synchronizing signal (test clock sync signal) which in turn is provided to an E111 one to nine clock fanout circuit 512. Both the system clock and test clock sync signal drive their respective E111 fanout circuits 508, 512 so as to fanout and distribute the system and test clock sync signal (across the back panel) to all the motherboards 202.

All system clocks are fanned out with equal line lengths to all the motherboards 202 where they are routed through more E111 one to nine clock fanout circuits 514. These in turn drive the board mounted ASICs and TTL clock buffers which drive the JPs, SLCCs, EDAC's, FPGA's, and other elements requiring TTL clocks. On each ASIC, the system and test clocks are automatically deskewed with a PLL, so the clock delay through all ASICs is compensated. The TTL clock buffer, like the ASICs, also has a PLL to compensate for both the delay through the buffer and for the etch and load on the buffers.

Similarly, the test clock sync signal is fanned out to all the motherboards 202. The test clocks generated on the motherboard are fanned out to all components requiring a test clock via an E111 one to nine fanout circuit 512 and H641 PECL to TTL level translators 516. The test clocks are used for both scan and reset control and to control the resource section of the boards.

The system clocks also are used to generate the PCI clocks on each motherboard 202. This is accomplished by inputing the system clocks to a divide by two circuit 518. The PCI clock preferably operates at 25 MHz and fans out to all PCI bus circuits, including the GG ASIC 280. The GG ASIC 280 synchronizes the 25 Mhz clock with ASIC_CLK (ASIC's internal version of the System Clock) for use in gating the D inputs to internal F/Fs. This is accomplished by first clocking on a falling edge of ASIC_CLK and then clocking on a leading edge of ASIC_CLK.

The clock circuitry/logic 256 also includes clock failure detection circuitry 520 that senses a stoppage of signal pulses from the primary oscillator 500 or distribution logic. The detection circuitry also is capable of sensing other failures such as a stuck high or low condition. The clock failure detection circuitry 520 includes four E431 F/Fs 522a–d, two OR gates 524 and an E431 divide by 2 F/F.

An output from the E131 divide by two 504 for the margin clocks (e.g., 55 MHz) provides clock input for the E431 divide by two F/F 526. The output from the E431 divide by two F/F 526 provides clock input for two of the E431 F/Fs 522a–b (i.e., sets the F/Fs). The motherboard level clocks are also feed to the reset of these two E431 F/Fs 522a–b. In this way, a failure of the primary oscillator 500 (e.g., no output) will result in the failure of the F/F reset to be asserted.

The OR gates 524 and the remaining E431 F/Fs 522c–d are interconnected to the outputs from the E431 divide by two 526 and the first two E431 F/Fs 522a–b such that, when there is a failure to generate system clocks from the primary crystal 400, the third E431 F/F 522c provides an output representative of the failure. The fourth E431 F/F 522d generates an output to the back panel to force selection of the backup motherboard's clock circuitry logic 256, i.e., the slot 1 motherboard.

The motherboard at either backplane slots 0 or 1 can switch or re-designate the source of the clocks from the normal clock source (i.e., circuitry on motherboard in slot 0) to the backup clock source. This is accomplished by the assertion of a wire-or PECL_MUX_SEL_OUT wire on the backpanel. The clock source is switched to the backup clock and the resources section on the motherboard designated as the Diagnostic Master will force the system to go through COLD_RESET_N.

Once the backup clock has been selected, the clock failure detection circuit 520 will continue to monitor the clocks source from the backup clock circuitry/logic. If a failure is identified while the PECL_MUX_SEL_OUT is asserted, the microcontroller 300, on each motherboard 202 that detects the error, will activate the TN pins on all of the board ASICS. This tri-states the ASIC outputs and eliminates part damage due to extended bus fighting. If there is only one motherboard 202 in the computer system 200, and the clock fails, the clock failure detection circuitry 520 will cause the TN pins to be activated, thereby protecting the board components. Because the microcontroller 300 has the capability to switch clock sources from nominal to margin clocks, one can bring the motherboard 202 back on line at margin speed.

The computer system 200 of the instant invention scans the boards, board mounted chips, busses, blowers and power supplies comprising the system to verify the integrity and operability of the system before applications are loaded. Such scanning is done when the system is powered up and also after the system detects a fatal error. The scanning operation includes automatically detecting a fault, automatically isolating the fault to at least a FRU and automatically de-configuring the system so as to logically and functionally removed the isolated component/FRU. After the system is deconfigured, the system automatically re-boots itself and re-loads any applications program. In this way, the system has the capability to automatically recover the system after it has suffered a failure event without requiring intervention of the user or service representatives.

The board mounted ASICs and the boards are designed with integrated JTAG IEEE 1149.1 test logic so test patterns can be shifted into one device, driven onto the logic board and captured at another device. In this way, board interconnect can be verified. The standard also provides for the verification of proper component selection and proper device insertion. The computer system will implement both the boundary scan and full scan implementations of the IEEE standard.

Figure 12:
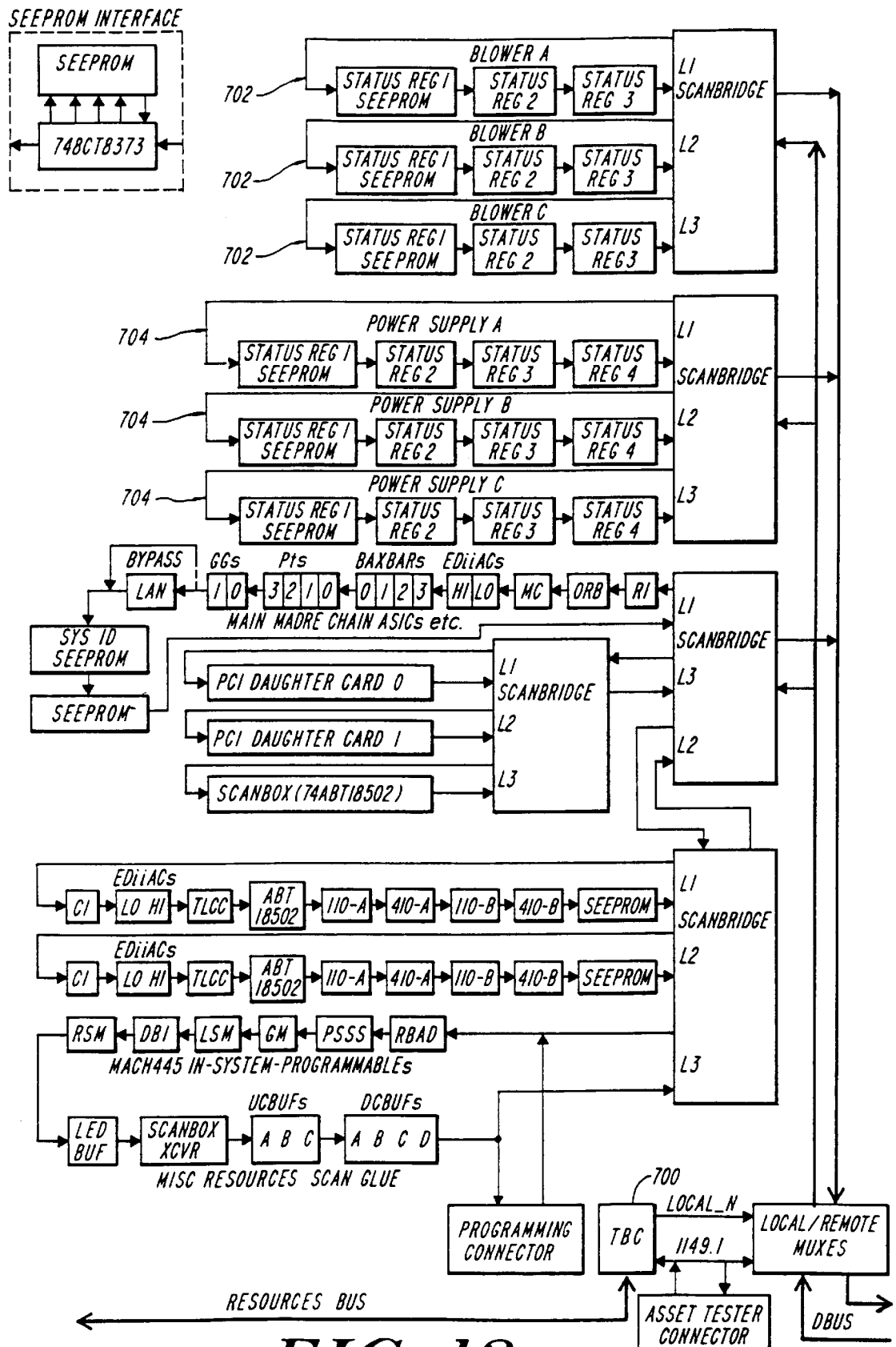
FIG. 12 is the scan chain/scan logic for the motherboard located at position "0" on the backplane.

There is shown in FIG. 12 the scan the scan chains and associated logic for a portion of the computer system, specifically those for the motherboard 202 located in slot "0" on the backplane. The scan chains for the motherboards in the other backplane slots are established based on the components which are to be scanned by that motherboard (e.g., board/board level components and power supplies). Scan chains will be used as a basis for test of the boards and board mounted ASICs. Board-level opens, adjacent pin bridging, proper component selection and insertion will be tested via 1149.1 boundary scan.

Each motherboard 202 includes a microcontroller 300 that is responsible for reset generation, scan-based powerup interconnect testing and ASIC testing. The microcontroller 300 shares the Resources bus with the RI ASIC 306. When reset is first applied, the microcontroller 300 asserts a signal to the RI ASIC 306 that forces the RI ASIC off the Resources bus. The microcontroller 300 can then test the bus and use the Test Bus Controller (TBC) 700 for scan-based tests. Following powerup interconnect and ASIC scan-based tests, the microcontroller 300 deasserts the control signal to the RI ASIC 306, allowing the RI ASIC to provide normal system access to the Resources bus and its associated devices.

Scan chains will be used to identify all boards and board mounted ASICs in the computer system. Specifically, the presence of each motherboard 202 and the associated JP daughter boards 250 will be detected and board serial numbers and the system ID will be read via scan. Also, ASIC part numbers and revision numbers will be read on powerup via scan. For EEPROMS and SEEPROMS, a buffer is included so information can be extracted during the scanning process.

Scan chains also are used to communicate with the power supplies 210*a–c* and the cooling blowers 212. Power supply status functions, e.g., turned on, over temperature, over/under voltage, and disabled, and control functions, e.g., fault masks and disable, are also performed through scan. Blower status, e.g, high speed, low speed, ambient over temperature, turned off and control, e.g., fault masks, speed up, disable) is communicated through scan.

The scan interface part is the Test Bus Controller (TBC) 700, an off the-shelf part no. 74ACT8990 available from TI (see also Texas Instruments, *Advanced Logic and Bus Interface Logic Databook*", 1991). The TBC 700 functions as an 1149.1 controller, where parallel data is written to and read from the TBC, while serial 1149.1 data is generated and received. The TBC resides in the local resources 260 of each motherboard. The microcontroller 300 uses the registers inside the TBC to perform system scan operations.

To perform a scan operation, the PROM code loaded in the microcontroller accesses the registers inside the TBC 700. Data will be transmitted in order to specify the target board, the target device, and the operation to be performed. Operations will consist of scan chain shift operations, loopback operations, and others as they become known.

The TBC 700 uses the Addressable Shadow Port (ASP) to select and communicate with one or all of the board scan chains in the system. Each ASP has hardwired node address input signals that allow the ASP to distinguish messages directed to its local chain. The node address inputs are based upon the "node ID" that is hardwired to the motherboard's backpanel connector. A "broadcast" address can be used that allows the master TBC to communicate with all board scan chains in the system, should this be desired. The ASP protocol is detailed in *A Proposed Method of Accessing the 1149.1 in a Backplane Environment,* Lee Whetsel, International Test Conference, 1992, the teachings of which are incorporated by reference.

The Diagnostic Bus Interface (DBI), a PAL, interfaces the TBC with the backpanel DBus 208 and the ASP. The DBI's job is to allow three modes of operation: local mode, remote mode, and manufacturing test mode.

In local mode, data from the TBC 700 is sent directly to the local scan chain and data from the local scan chain is sent directly to the TBC. The DBus 206 is not disturbed by local scan operations. As such, the motherboards can operate in the local scan mode in parallel and simultaneously. These simultaneous scan operations will occur during powerup testing.

In remote mode, data from the TBC 700 is sent out to the DBus 206 and data on DBus is returned to the TBC. The local scan chain is also connected to DBus 206 through the ASP part. This allows the TBC 700 to address any motherboard in the system as well as its own. When the address broadcast by the TBC 700 onto DBus 206 matches a board's hardwired address, or a broadcast address, the ASP connects the local scan chain to the DBus.

In manufacturing test mode, the DBus 206 is connected directly to the local scan chain and the TBC 700 and ASP are not used. This mode allows manufacturing to directly apply test vectors to the local scan chain through the backpanel DBus signals of no interest to the current scan operation may be placed in bypass mode.

The Master microcontroller uses the TBC 700 and DBI to communicate over the backpanel diagnostic bus DBus 206 and to the DBI/ASPs on the other motherboards. The master TBC transmits a "select" protocol to address and enable the ASP connected to the slave DBI of the selected board(s). Once selected, the master and slave are "connected" and the master TBC can perform scan operations transparently on the remote board(s), using standard IEEE 1149.1 protocol.

The DBus 206 consists of the four standard IEEE 1149.1 signals (TCK, TDI, TDO, and TMS) and a "Diagnostic Interrupt Request" signal, DIRQ_N. During system powerup, DIRQ_N is used in determining diagnostic mastership. During normal system operation, the DIRQ_N is used by the Power System components to interrupt the master microcontroller.

A number of IEEE 1149.1 features help to ensure that test circuitry does not interfere with normal system operation, should signals become stuck. Logic levels are chosen such that, in the event of a broken driver, signals float to levels that cause the test interfaces to go into 'Test Logic Reset' mode. When the test interfaces are reset, the test logic is placed in a benign state. A "driving DBus" LED also is included on each motherboard to assist-in isolating some types of DBus faults. It will be lit whenever a board's DBI is driving any DBus output.

The DIRQ_N DBus signal serves a number of functions. As mentioned above, it is used to determine diagnostic mastership during the powerup procedure.

During normal system operation, the DIRQ_N signal is used by a power supply 210 or blower 212 to attract the attention of the master microcontroller. When the device detects a fault condition, it sets its DIRQ register bit and the interrupt is forwarded to the master microcontroller by driving DIRQ_N on the backpanel DBus 206. The master microcontroller then attempts to access the TBC 700 through the normal motherboard level busses on the DM's motherboard and the RI ASIC 306.

If the motherboard level busses function normally, the master microcontroller can successfully access its master TBC 700. The master microcontroller begins scanning the slave DBIs in the computer system 200 to determine which device asserted DIRQ_N. When a device's DIRQ register bit is found asserted, it is cleared and the device is serviced.

If a hard failure occurs on the motherboard level busses, the DM may not be able to access the master TBC is or the watchdog timer (WDT), which is also in the local resources 260. In this case, DIRQ_N will remain asserted on DBus 206 for an unacceptably long time and the computer system will hang. When the hardware WDT timer times out, NMI, warm reset, and finally cold reset will be successively invoked to break the hang. During the ensuing powerup testing associated with cold reset, the hard failure will be isolated and a new diagnostic master may be chosen.

As indicated above, for purposes of providing high availability, the power supply system for the computer system is designed as an (N+1) redundant configuration. Where pairs of motherboards share three power supplies 210*a–c,* but require only two. A single mother board uses two supplies, but only requires one. Each power supply features a 74BCT8373 scannable latch part that is accessed by the local scan chain 702 on one of the two related motherboards. Fault status can be scanned out, and control commands can be scanned in. Power supplies 210a–c can be disabled, after a delay, and the DIRQs can be masked.

Because PIBus electrical characteristics dictate that the motherboards are populated left-to-right, an even-slot-numbered motherboard will always be present, e.g., slot 0, in an even/odd motherboard pair being powered by the (up to) three power supplies 210a–c. Therefore, the even-slot-numbered motherboard's local scan chain will always be used to communicate with the power supplies for that motherboard pair.

In addition to communicating with power supplies, the local scan chains on the master microcontroller's motherboard are used to communicate with the three blowers 212 and the system ID buffer. The system ID is stored in a SEEPROM part 204 that is socketed on the backpanel. The SEEPROM also will be used to store system history information.

The blowers 212 of the computer system 200 also are configured as (N+1) redundant. Three blowers are provided, but only two are needed. The master microcontroller's motherboard local scan chain 704 communicates with the three blowers of the computer system 200. The two main functions provided for the blowers are notification of blower faults and adjustment of blower speed.

When a blower fault occurs, circuitry on the blower interface detects the fault and sets a bit in a IEEE 1149.1 scannable register. The circuitry also sets the blower's individual DIRQ register bit, which causes the backpanel DIRQ_N signal to become asserted. This is then handled by the master microcontroller as previously described for the power supplies. The speed of the blowers can be adjusted by means of a scannable register part on the blower interface board.

In specific embodiments, the scan test suite of the instant invention for the design of the board mounted ASICs includes using the Synopsys Test Compiler. The compiler supports 6 different scan methodologies: muxed flip-flop, clocked scan, single latch LSSD (Level Sensitive Scan Design), double latch LSSD, clocked LSSD, and auxiliary clock LSSD (see Scan Methodologies, Marshall Wood, the teachings of which are incorporated herein by reference). In a preferred embodiment, the muxed flip-flop methodology is used. Because muxed flip-flop uses the normal system clock, the test access port ("TAP") controls the system clock enable within the each ASIC.

All board mounted ASICs of the instant invention will be IEEE 1149.1-compliant and include a TAP and associated pins TCK, TMS, TDI, and TDO. All ASICs and the other 1149.1-compliant components on each motherboard are incorporated into a single logical 1149.1 chain. The TDI and TDO signals will be cascaded from one device to another and the required signals TCK and TMS are buffered appropriately.

All 1149.1 compliant devices of the computer system include a boundary scan register. This provides a hardware-assisted means of verifying that the correct parts are properly inserted on the board. Further, this verifies that the I/O drivers, boundary scan cells and bonding wires in the parts are functioning correctly and that board etch between parts is intact.

Each board mounted ASIC, will include a device identification register, e.g., the 32-bit "Device Identification Register" of the IEEE 1149.1 standard. The device ID register for each board mounted ASIC contains a unique code that identifies the part (e.g., as a DG part, some derivative of the DG part number) and the revision number of the ASIC. At least some of the board mounted ASICs include design-specific Test Data Registers (TDRs) that are accessed through the TAP.

The board mounted ASICS also are designed to allow full scan so that every logical flip-flop in the ASIC will be scannable. This feature provides a number of benefits, including the ability to scan-access machine state following fatal errors and improved coverage during chip testing. The Full Scan TDR will access the full scan circuitry embedded in the ASICs.

Dedicated TDRs will provide control and status for hardware-detected errors within the ASIC and the circuitry it controls (if any). Each ASIC's Error Status TDR will also have a read/write bit that indicates, when asserted to a logic 1, that the ASIC is currently driving its FATAL_OUT_N signal. The external signal is active-low (logic 0) and is driven to the ORB ASIC, where it is combined with other ASICs' fatal signals and distributed through-out the system.

The Error Mask TDR contains one bit for each error detected by the ASIC, and one bit for FATAL_OUT_N, where a "1" masks the error out (normally register written with all 0's). Each ASIC's Error Mask register will be designed such that the bit positions for each error's mask correspond to the bit positions in the Error Status register. The Error Forcing TDR contains one bit for each error detected by the ASIC. A logic "1" in this register causes the ASIC to generate an error of that type (normally register contains all '0's).

The status bit for each error will be read/write, active high, and will indicate, when asserted, that the error has been detected. Therefore, a "0" in this bit means that no error has been detected and reading "all zeros" from the Error Status TDR will indicate that no errors have been detected.

The following describes how the scan chains will be used in connection with the testing of the computer system 200. Following deassertion of powerfail reset, the microcontroller 300 on each motherboard 202 takes control of the Resources bus and the associated DBI, thereafter having reign over the scan environment for that motherboard. First, the microcontroller 300 tests the Resources section to ascertain its integrity. Then the microcontroller 300 initializes the scan environment by using the TBC to place all the TAP controllers in the 1149.1 devices into the Test-Logic-Reset state. TMS will be forced to logic 1 for at least 5 TCK cycles.

Next, the microcontroller 300 begins performing inter-connect tests on the motherboard. This is done by fetching test vectors stored in on-board EEPROM 302, and applying the vectors through the DBI. Failures in these tests can be reported through console messages, and by lighting a failure LED on the board.

Finally, the microcontroller 300 performs ASIC testing by applying test vectors through the TBC 700 to the board mounted ASIC. These test vectors also are stored in the EEPROM 302. When this phase of testing is complete, the microcontroller 300 gives up control of the Resources bus and allows normal processor requests to come through the RI.

The microcontroller for each motherboard begins sizing the computer system by again placing the TAP controllers in the Test-Logic-Reset state. In this state, the TAP controller loads the IDCODE instruction (or BYPASS, if IDCODE is not supported) into the 1149.1 Instruction Register. The IDCODE instruction causes the device ID register to be connected between the TDI and TDO pins of each device. BYPASS selects the single bit ('0') "bypass"register. The device ID register is 32bits long and begins with '1'. These bit definitions allow a bit stream from multiple devices to be parsed for device IDs.

The TBC 700 will use the Scan Path Linker (SPL) devices or scan bridges to multiplex the corresponding optional TDI/TDO chain into the main TDI/TDO chain for the motherboard 202. The SPL devices feature parallel input signals that can be connected to "board present" signals. The microcontroller can read these signals and connect the appropriate JP daughterboard scan chains. There are a number of ways to verify that the JP daughterboard chains are connected. When microcontroller reads the device ID registers from all the devices on the chain, it can determine if devices known to exist only on the JP daughterboard are present, or simply count the number of devices scanned. Either method can determine that optional devices are present. Ordering of hardwired scan components and option card components will be chosen such that an option card's position can be determined with certainty.

I/O daughterboards (e.g., PCI Expansion cards 282) can be detected by polling the PCI channels for devices. The microcontroller can then decide if the I/O daughterboard(s) should be muxed into the TDI/TDO chain.

Each motherboard 202 sizes itself by checking for daughterboard options and checking all ASIC revisions. The microcontroller can temporarily store the sizing information in a concise format in an easily-accessed on-board location, e.g, the RAM in the local resources 260. The DM can read this RAM later and build the overall system configuration table.

To determine if a motherboard remote to the master microcontroller is present, the master microcontroller transmits an ASP "select" protocol to the motherboard's address. If an ASP "acknowledge" response is received, then the remote motherboard is present and the microcontroller may begin communicating with it. If no acknowledge response is received, it will be assumed that the addressed motherboard is not present in the system. No further communication with this address will be attempted.

Devices available only through the slot 0/slot 1 DBI can be sized in the same manner as the motherboard is sized for optional daughterboards. The backpanel SEEPROM should always be found present. If it is not present, then a break will be detected in the chain at the SEEPROM component's position and the SEEPROM will be reported missing. Each blower or all blowers is connected to one of the slot 0/slot 1 DBI's optional TDI/TDO chains. It is important to note that the sizing process at this point uses only dedicated diagnostic hardware. The "normal" system logic, such as the PI arrays, does not participate in this phase of sizing.

As indicated above, the computer system 200 is designed to isolate the fault to at least a FRU and then deconfigure i.e., functional and logically remove the FRU from the system. To deconfigure a section of logic, the 1149.1 optional HIGHZ instruction is invoked and when used, the instruction places all outputs in a high-impedance state. Because every board mounted ASIC implements this instruction, a fine granularity of dynamically reconfigurable units ("DRUs") will be achieved.

To deconfigure a JP daughter board 250, the CI ASIC 414 and the TLCC ASIC 408 mounted thereon is placed in HIGHZ mode. Alternatively, the JP 250 also can be placed in reset through a control register in the CI 414. To deconfigure a motherboard 202, all PI ASICs are placed in HIGHZ mode. Because the motherboard also has I/O devices on it, the I/O bus(ses) should be disabled via a control register in the GG ASIC 280.

During the powerup process, the board mounted ASICs (e.g., PI ASICS 290) are initialized by means of the scanning process. At a later stage of the powerup testing process, IDs and memory ranges are loaded into the ASICs by control space writes.

As provided above, the EEPROMS 302 include the firmware for the microcontroller 300 and the JPs 250, particularly the JP designated as the diagnostic master and the microcontroller designated as the master microcontroller. The firmware for the microcontroller includes powerup testing, scan testing, error handling, system sniffing during run-time, and scanning error state when system fatal error occurs. The JP firmware includes powerup tests, XDIAG tests, manufacturing mode tests, and error handling.

The microcontroller 300 is the first piece of hardware in the computer system 200 to be used for firmware diagnostics. It comes out of cold reset and is able to test itself and its resources while the rest of the system is being held in warm reset. It initiates JTAG boundary scan on all of the scannable components in the system and will initialize internal scan state as well. It is responsible for bringing all other sections of the system out of reset in an individual manner, to keep isolatability at a high level. It monitors the per-board powerup tests, controls the Watch dog timer (WDT) mechanism and takes care of EEPROM flashing. During runtime, when the operating system is up, the microcontroller 300 is responsible for sniffing tasks to make sure system operations are still functioning properly.

A tabulation of the powerup tests performed by the microcontroller 300 is provided in FIGS. 13A, B. The sequence of events executed by each microcontroller 300 on each motherboard 200 during powerup is as follows.

Each microcontroller 300 comes out of reset at approximately the same time. Each microcontroller then checksums its on-chip EEPROM and tests its access to on-chip SRAM. IP as an error is detected, then the microcontroller executes a generic error handling function. An attempt also is made to set the resource bus LED to provide an indication of a failure. The microcontroller then executes a STOP instruction.

Each microcontroller initializes its on-chip hardware modules. Once its on-chip UART is initialized, code revision information and cause of microcontroller reset are printed to the individual auxiliary consoles.

Each microcontroller runs on-board diagnostics for the following sections of the Resource Bus hardware: TBC 700, SRAM, EEPROM 302, NOVRAM/RTC, DUARTs, LSM, RSM, P555, GM, and clocks. Once board 0 DUART testing has been performed, board 0's microcontroller 300 prints a message to the system console. All microcontrollers except slot 1's microcontroller will test DUARTs early in their resource bus test suite. Slot 1's microcontroller will test DUARTs late in its test suite. This is to prevent external loopback collisions when slot 0 and slot 1 write to the system console and feedback DUARTs.

Any errors or faults of the these components are considered fatal for the motherboard and will result in the deconfiguration of that board. The following describes the deconfiguration process which will occur on the board when the failure is detected.

As soon as an error is detected, a generic error handling function will be executed. An error code is printed to the auxiliary console and an attempt is made to set the resource bus LED in order to indicate a failure.

An attempt is made to write failure information (error code, test/sub-test, slot, and FRU/sub-FRU) to the NOVRAM error log. This information will not be accessible by any system JP since the board is held in cold reset and no Scan testing/initialization has been performed.

A message is placed in the onboard scannable mailbox to inform the master microcontroller that an error was taken. The content of this message will simply state that a fatal motherboard deconfiguration error occurred. If the attempt to write the mailbox fails, this too is valid information as the default master microcontroller, i.e., slot 0 microcontroller, will eventually poll everyone's scanbox. It will find a RESET status in the offending motherboard's mailbox which will be enough of an indication that the motherboard failed catastrophically. If the error occurs on the current default master microcontroller, then the same steps are taken. Eventually the secondary master microcontroller will time out, having not received either a scan message or DUART loopback traffic and take mastership over the system.

Finally, the microcontroller will execute a STOP instruction and the motherboard will be held in cold reset, while in this state. An attempt will be made to keep the microcontroller in an idle loop instead of executing the STOP instruction. In this manner, the NOVRAM error log can be potentially read by the diagnostic master JP later in the powerup process.

Cold reset is deasserted for the system and for each slot, and each microcontroller determines in-slot sizing information as well as executes in-slot scan tests. At this point the first of three NOVRAM tables, that table describing each motherboard's physical hardware is built. In slot sizing will bypass the SB1 and SB2 Scan Bridges for the Power Supply and Blowers, as these will be tested by the master microcontroller during off-board scan test. Should any error be detected while performing in-slot scan testing follow the same steps as outlined above for deconfiguration with the following exceptions.

The scan tests, unlike the on-board microcontroller diagnostic testing, can fail without the need to deconfigure the motherboard. For example, if any of the daughter board specific tests fail, only the daughter board need be deconfigured. If any of the motherboard specific tests fall, however, then the motherboard will be deconfigured. If the motherboard/daughter board interconnect test fails, then either the daughter board or the entire motherboard will be deconfigured depending upon the degree of isolation provided by that test. Once a FRU has been determined bad during scan testing (e.g. JP, daughter board during TAPIT), it will be immediately deconfigured and, therefore, bypassed for the remainder of the scan testing. All specific error information, as well as on-board sizing information, will be kept locally in each motherboards NOVRAM.

Once the on-board scan testing has been completed or the motherboard has been determined bad at any point during the scan testing, then a message is placed in the scannable mailbox to inform the master microcontroller as to the outcome of the scan testing. The content of this message will simply state that a fatal motherboard deconfiguration error occurred or the motherboard passed testing. A pass/fail message is also placed in the microcontroller's mail/scan box for the slot 0 motherboard, the location of the default master microcontroller. In the case of a slot 0 motherboard failure, the slot 1 motherboard will eventually timeout, assume mastership, and then gain access to slot 0 motherboard's scanbox information.

The microcontrollers deassert DIRQ_N to synchronize with the master microcontroller and await further commands through their respective scannable mailbox. A master microcontroller is then chosen. The purpose of such a master is to allow only one microcontroller to gather system sizing information and run out-of-slot scan tests. In addition, microcontrollers will become unsynchronized due to previous test failures as well as differences in slot hardware configurations. It is the job of the master microcontroller to synchronize all microcontrollers in the system. If the microcontroller on the slot 1 motherboard is chosen as master microcontroller, then from this point onward there will be no master microcontrollers to default.

The master microcontroller waits for the microcontrollers on the other motherboards to finish in-slot scan tests. This is accomplished by first having all microcontrollers drive DIRQ_N low prior to initiating scan operations. As each microcontroller finishes scan testing, they individually drive their DIRQ_N high. The master microcontroller, upon finishing its own testing, monitors the DIRQ_N line and once the DIRQ_N line is high, the master microcontroller will know that all scan testing has been completed. All microcontrollers should be synchronized at this point.

The master microcontroller then sizes the computer system to determine which boards are present. As part of sizing, each microcontroller's scannable mailbox is polled by the master microcontroller to determine if there has been a resource bus or on-board Scan failure. The contents of the mailboxes are left intact and the pending requests unacknowledged in the event master microcontrollership passes and the steps have to be repeated again. The mailbox information will indicate failed motherboard status for each board, or a pass indication. If no indication is present in the scanbox (i.e. a reset value) then the assumption is that the motherboard failed. If failures exists, the associated motherboard(s) will be excluded from off-board scan testing. At this point the SEEPROM system backpanel ID test is performed and using data from the SEEPROM, the master microcontroller constructs the second of the three NOVRAM tables. This table contains SEEPROM sizing information indicating what the systems hardware was the last time the system was powered up. The Midplane SEEPROM is not updated with the new configuration data until after the "diagnostic master" JP has been chosen.

The master microcontroller runs the remaining off-board scan tests including power supply, blower, and backpanel interconnect testing. Any motherboards that were deconfigured as a result of previous testing will not be included in backpanel interconnect testing. If off-board scan testing is successful, a message to that effect is placed in the slot 1 motherboard's mailbox. The slot 1 motherboard microcontroller, now in an idle loop, periodically checks for a special non-printable character printed to the system console, via the feedback DUART, as well as a status message in its scannable mailbox. This DUART character will be issued by the slot 0 motherboard at the same time as the scan message is sent, i.e., right after off-board scan testing has completed.

If the master microcontroller is on the slot 1 motherboard, then the message buffer and DUART checking described above will not be performed. If off-board Scan testing fails in a manner which is attributable to the slot 0 motherboard or in a way which is not isolatable and the current master is the slot 0 motherboard, then microcontroller mastership is passed to the slot 1 motherboard via the scannable mailbox. This is the first of two cases where mastership is passed directly by the slot 0 motherboard, omitting the timeout mechanism. If off-board Scan testing falls in a manner which is attributable to another motherboard and the current master is board 0, then the offending motherboard is deconfigured and mastership is retained by board 0.

If off-board Scan testing fails, and the current master is board 1, then the slot 1 motherboard takes the necessary steps to deconfigure all offending motherboards indicated by the failures. If the error is attributable to the slot 1 motherboard then a fatal system error results. The DUART and message passing protocols provide alternate means of detecting scan test failures from the slot 0 motherboard, assuming mastership has not already been passed for any of the reasons already described. If the slot 1 motherboard fails to receive either form of communication and it is not already master, then after a specified timeout period, it will assume microcontroller mastership and perform the above described actions of the master microcontroller.

If the slot 0 motherboard does experience a self or non-attributable off-board scan test failure, the error is logged in it's NOVRAM, and mastership is passed. However, the motherboard is not deconfigured because it has up to now proven itself to be a good board with exception of being capable of off board testing. This in and of itself poses no threat to the remainder of the system just so long as it is not responsible for performing system scan functions. The slot 1 motherboard, when it takes over must begin off-board scan testing from the very beginning regardless of how far the slot 0 motherboard had already gotten just to prove that it has no problem accessing all off-board resources. If the slot 1 motherboard detects a problem with the slot 0 motherboard, then the slot 0 motherboard will be deconfigured. If no problem is found, then the slot 0 motherboard's problem is attributable to it's off-board scan hardware. It still remains a healthy system board unless proven otherwise as testing continues.

To deconfigure, the master microcontroller will issue a command via the scannable mailbox. The reception of a deconfiguration message causes the offending motherboard to update it's local copy of current board status kept in a NOVRAM table.

The master microcontroller, via the scannable mailboxes, tells every microcontroller to deassert warm reset for both the system and the slot and begin taking the JPS out of reset. All microcontrollers should be synchronized at this point. Each motherboards' microcontroller sees to it that the deconfigured daughter boards and motherboards indicated in the NOVRAM tables, are not included in the JP testing which is about to take place. As noted above, all of the scannable mailboxes still contain the pass/fall indication of each motherboard. This information is maintained in the event that local NOVRAMs are inaccessible by the "diagnostic master", thus maintaining at least some indication of the failure.

The microcontrollers take each in-slot JP out of reset, one at a time. Each JP runs a Suite of "primary tests" which includes basic sanity diagnostics. The microcontrollers monitor the status of these tests by reading on-board SRAM locations updated by the in-slot JPs. In this manner, microcontrollers can recognize test completions, failures, and hangs.

Each Microcontroller chooses an in-slot JP (which successfully completes its "primary tests") to run its "secondary test" suite. This test suite includes the time consuming operations of memory and I/O initialization/testing. However, allowing such testing to occur in parallel, i.e., across motherboards, will help decrease overall powerup time. As in primary testing, each microcontroller recognizes test completions, failures, and hangs. Secondary tests will be run until at least one in-slot JP passes all extensive tests or all in-slot JPs have been exhausted. Each microcontroller will then send "board slave" and "board master" messages to the appropriate in-slot JPs.

The master microcontroller will await the completion of all of the JP's "secondary tests" via the DIRQ_N mechanism already explained above. The master microcontroller will then tell its Board Master JP to run "tertiary tests." The first part of this testing begins when the master, via the RI/Resource Bus path, reads extensive configuration information from each non-deconfigured motherboard's NOVRAM. This information is required by the master in order to conduct tertiary testing. This test suite includes all off-board JP and memory diagnostics.

If the testing succeeds, a "diagnostic master" message is sent to this Board Master JP. If the slot 0 motherboard fails tertiary testing, the error is marked in the NOVRAM and the system attempts powerup again only with the microcontroller of the slot 1 motherboard as the default master. If the slot 1 motherboard also fails tertiary testing then a fatal system error results. If either master detects problems with other motherboards during tertiary testing, then those failing motherboards will be deconfigured. Once the "diagnostic master" is finally chosen, its associated motherboard will be mapped as the global resource board.

During the entire process of selecting a diagnostic master all failing tests and resulting motherboard/daughter board deconfigurations will be logged in each boards NOVRAM error log and the NOVRAM configuration tables. Just as had been done for the on-board microcontroller diagnostics and scan failures. At the completion of selecting the "diagnostic master", the diagnostic master JP will poll the various NOVRAMs to determine complete error and deconfiguration information, if any. All current system configuration information is now be written to the system ID SEEPROM 204.

A machine initiated (MI) callout is now be issued flagging all failed tests and deconfigurations and all scanboxes are cleared. This polling of the NOVRAM will be performed by the diagnostic master via RI ASIC access of the resource bus. Should this RI path access fail for any of the motherboards which have already been deconfigured, then the scanbox information, which is still present, can be used as a limited source of information. Alternatively, the DM can request the failing motherboard microcontroller to access the NOVRAM and return the information via the falling motherboards scanbox. In yet another way, error and deconfiguration information is copied into the local motherboard SEEPROM just before a board is deconfigured. From there the master microcontroller can access the information via off-board scan.

Finally, each microcontroller enters its "idle loop". Within the loop, the microcontrollers will periodically read on-board SRAM in order to process (global or local) requests from system JPs. Additionally, watchdog processing, board sniffing, and run-LED blinking will be periodically performed in this loop.

By the time which each JP comes out of reset, the assumption is that the microcontroller on each board has tested everything in its local resources 260 (e.q. NOVRAM, EEPROM, SRAM etc.), the blowers, and the power supplies. Also the motherboard has been scan tested. If there is any failure in the above tests, the microcontroller has taken the action(s) to ensure that the motherboard meets the minimum requirements to function correctly. Otherwise, none of the JP'S for that motherboard is taken out of reset and the motherboard will be put back into reset. In addition, JPs will not check for any blower and power supply failure during powerup.

The JP PROM powerup sequence is divided into three stages. Upon executing each step, each JP will send a message to the microcontroller on its board, and writes the FRUs or DRUs which is/are going to be tested in the NOVRAM. An error code also is written in the NOVRAM so that in case of a failure/hang, the system will know where the problem is and have the information to make a MI callout. If the test failed, the microcontroller gets a error message from the JP and in the case of a hang, the microcontroller will timeout. There is provided in FIGS. 14–16, a tabulation of the powerup tests performed by the JP and the DM JP.

JPs on each board will be taken out of reset in the order of $JP_0$, $JP_1$, $JP_2$, and $JP_3$. Three actions will be preformed by each JP for each of the following steps: 1) it informs the microcontroller which test will be run next; 2) writes the FRU(s) name involved in the test and the error code in NOVRAM; and 3) executes the test. Upon finishing each stage, the JP waits for instruction from the microcontroller what to do next, i.e., continue to next stage or stay idle.

For primary stage testing, the microcontroller brings each JP on its motherboard out of reset one after another. The following tests are performed at the primary stage.

JP runs self-tests to verify it is functioning properly.

JP runs the PROM Access Test to make sure it can access PROM correctly.

JP tests local SRAM accesses.

JP tests NOVRAM accesses.

JP initializes the stacks, the SCM, FE. and the spads in SRAM

JP runs tests that will isolate faults to the daughter board (i.e., 88110/88410s Caches, CI, TLCC, EDAC tests). Some of these tests will be rerun when there are multiple JPs out of reset so that interactions among the JPs can be tested and still isolate to the daughter board.

JP runs RI register access (write/read) tests, including using backdoor method to write/read from itself.

JP runs PI register access (write/read) tests.

JP runs GG register access (write/read) tests.

JP runs MC register access (write/read) tests.

JP sizes and initializes the MC, PI, EDAC registers and main memory on the motherboard.

JP runs a quick main memory test, if there is any SIMM, on its motherboard. This test will be run on the first SIMM in the first bank of memory (i.e. at most 32 MB will be tested) only. This test will verify that the JP can access memory.

The microcontroller will put the JP which failed any of the above steps back into reset. If anyone of the two JPs on a JP daughter board failed any of the tests, that JP and the daughter board shall be marked dead and deconfigured. Also a MI call will be made later by the DM. If both JP daughter boards are deconfigured, the rest of the associated motherboard will be tested after the DM is determined. If all the daughter boards are bad in both slot 0 and 1, the system will be powered down.

After each JP finishes the primary stage, it waits to be told by the microcontroller whether to go onto secondary stage or become a slave JP and go into an idle loop. The following tests are performed at the secondary stage.

JP sizes its own board and writes the information into NOVRAM.

JP writes a global test pattern and set a pattern_valid flag in SRAM for later testing.

JP sets all the MADV register(s) on its board.

JP runs some extensive tests on the MC EDACs, the Directory SIMMs, and the on-board main memory.

On a SIMM failure, JPPROM will deconfigure the SIMM bank in error. The entire memory subsystem will be deconfigured if any of the tests on MC, EDACs, and the Directory failed.

JP runs the on-board caches tests using its on-board main memory (if any exist).

if any of these tests failed, the daughter board on which the JP resides will be deconfigured.

JP sizes all the PCI devices and initializes the GGs on its own board.

JP runs extensive tests on the integrated SCSI and LAN controllers. These tests are run on each GG ASIC on a motherboard, one after another. If any of the tests failed, then that GG/PCI Bus subsystem will be deconfigured. Failure of both GG ASICs will cause the motherboard to be deconfigured.

Each Board Master collects all on-board information (e.g. which ASIC is good/bad, which JP is good/bad, its PROM revision number etc.) and writes it into NOVRAM.

Each Board Master initializes whatever is left on the board e.g. modem.

The foregoing tests are run in parallel with each other on the other boards. These tasks are done before the boards are enabled on PI busses. This testing is used to determine whether a particular board can be considered for Diagnostic Mastership.

The master microcontroller will tell the first JP on its motherboard that successfully completed the secondary stage of testing to be the acting diagnostic master (ADM) and to go on and perform the tertiary stage of testing, while the other JPs await instruction. The following tests are performed at the tertiary stage.

ADM runs self PIs loopback test (ThD).

ADM runs off-board tests to determine if it can access other boards in the system.

ADM tells JPs in the system to run extensive cache tests.

ADM collects each ACTIVE board's configuration information using the RI back-door method.

ADM enables itself on the midplane, i.e. resets the global bits both in RIs and PIs.

ADM initializes and tests other motherboards that don't have any working JPs on them, or runs I/O tests on boards that don't have any near memory. The DM uses memory on its board for SCSI scripts locations.

ADM makes a MI call if the hardware configuration information among Table 1, 2, and 3 in its NOVRAM are different.

ADM tells the Master microcontroller to update the SEEPROM on the back-panel according to the information in its NOVRAM—Table 3.

ADM does the final initialization for the whole system and sets up some control space registers for the operating system, i.e., DG/UX.

ADM takes all good slave JPs Out of the idle loops and SCM is entered.

There are four possible outcomes from the foregoing:

1) All tests passed. The ADM becomes the DM and finishes the remaining steps and halt to SCM.

2) A test failed and the ADM knows that it is the problem on its own motherboard.

3) The ADM hangs when running these tests and its microcontroller timeouts.

4) A test failed and the ADM knows which board is the problem.

In all cases, except for case 3, the ADM tells the master microcontroller the result of the tests. For cases 2 and 3, the master microcontroller will mark itself dead in its SEEPROM, and re-powerup the system. For case 4, the master microcontroller tells the failing board's microcontroller to deconfigure itself from the system. After the master microcontroller gets an acknowledgment, it will tell the ADM to restart tertiary testing with the running of the cache tests.

After the forgoing microcontroller and JP tests are done, the computer system boots from the default boot path. After booting the operating system (DC/UX), all JPs are under control of the operating system and no JPPROM will be run except when a system call is made.

While the system is running, the microcontroller 300 on each motherboard 202 executes sniffing tasks that verify the proper functioning of certain parts of the computer system. The resource bus specific tests include: NOVRAM Checksum, DUART Functionality, Power Supply/Blower status via the PSSS mach, EEPROM Checksum and TBC test. The master microcontroller also is responsible for statusing the power supply and blowers via a Scan chain operation. The microcontroller will need to check semaphore locks before accessing any of these areas in sniffing tasks so that no data is lost when a JP is trying to update or access an area.

As indicated above only the microcontroller and JPs on the motherboards in slot 0 and 1 on the backplane are viable candidates respectively for the master microcontroller and the diagnostic master. In default, the microcontroller and one of the JPs on the slot 0 motherboard are so designated. If the motherboards in both slots and/or the JPs in both slots are faulted and deconfigurable, then the system is shutdown.

Although a preferred embodiment of the invention has is been described using specific terms, such description is for illustrative purposes only, and it is to be understood that changes and variations may be made without departing from the spirit or scope of the following claims.

What is claimed is:

1. A method for automatically recovering a computer system following discovery of a fault condition, comprising the steps of:
    providing a computer system having self-testing and self-diagnosing capability;
    automatically testing the computer system;
    automatically identifying the presence of one or more faulted components from said step of testing; and
    de-configuring the computer system to functionally remove the faulted component from the computer system as identified by said step of automatically identifying.

2. The method of claim 1, wherein before said step of automatically testing the method further includes the step of recovering the content of a memory of said computer system.

3. The method of claim 1, wherein said step of testing includes performing continuity checks on the computer system components and interconnections between the components and, wherein said identifying includes analyzing the continuity checks to identify faulted components and interconnections.

4. The method of claim 1, wherein the computer system provided includes at least one application specific integrated circuit (ASIC) having a gated balanced clock tree circuit that automatically and selectively distributes clock pulses to logical F/Fs of the ASIC, the clock tree having a plurality of branches therefrom; and wherein the method further includes the steps of:
    configuring the gated balance clock tree circuit so clock pulses are distributed to at least some of the logical F/Fs when a computer system is in a first operational condition; and
    re-configuring the gated balance clock tree circuit to block the distribution of the clock pulses to the at least some of the logical F/Fs when the computer system is in a second operational condition.

5. The method of claim 1, wherein the computer system further includes two redundant system clocks, where the clocks of one system clock are provided to the computer system at a time;
    wherein the method further includes the steps of monitoring the system clock providing the clocks to the computer system for a failure; and
    configuring the computer system to functionally remove the failed system clock and to source the clocks thereafter from the redundant system clock, when said step of monitoring identifies a failure of the system clock.

6. The method of claim 1, wherein said de-configuring is accomplished such that continued operation of the computer system is in a degraded condition.

7. The method of claim 1, wherein following said de-configuring the method further comprises the step of operating the computer system in a de-configured condition.

8. A gated balanced clock tree circuit that automatically and selectively supplies clock pulses to the logical flip-flops (F/Fs) of an application specific integrated circuit (ASIC) comprising:
    a clock trunk in which flows the clock pulses to the logical F/Fs of the ASIC, the clock tree having a plurality of branches extending therefrom;
    at least one AND gate being disposed in at least one of the branches of the clock trunk feeding at least some of the logical F/Fs;
    control circuitry that controls each of the at least one AND gate so at least some of the logical F/Fs are fed only certain clock pulses; and
    wherein said control circuitry is configured so the AND gate automatically allows clock pulses to be feed to the at least some of logical F/Fs during a first operational condition of a computer system using the ASIC and wherein said control circuitry is also configured so clock pulses are automatically blocked by the AND gate when in a second operational condition of the computer system.

9. The gated balanced clock tree circuit of claim 8, wherein said control circuitry is configured so the AND gate allows clock pulses to be fed to the logical F/Fs when in a third operational condition.

10. The gated balanced clock tree circuit of claim 9, wherein the first operational condition corresponds to normal operation of the computer system, wherein the second operational condition corresponds to a fatal error condition of the computer system and wherein the third operational condition corresponds to a system testing of the computer system during at least one of powerup and following the fatal error condition.

11. A gated balanced clock tree circuit that automatically and selectively supplies clock pulses to the logical flip-flops (F/Fs) of an application specific integrated circuit (ASIC) comprising:
    a clock trunk in which flows the clock pulses to the logical F/Fs of the ASIC, the clock tree having a plurality of branches extending therefrom;
    at least one AND gate being disposed in at least one of the branches of the clock trunk feeding at least some of the logical F/Fs;
    control circuitry that controls each of the at least one AND gate so at least some of the logical F/Fs are fed only certain clock pulses;

wherein said control circuitry is configured so the AND gate automatically allows clock pulses to be feed to the at least some of logical F/Fs during a first operational condition of a computer system using the ASIC and wherein said control circuitry is also configured so clock pulses are automatically blocked by the AND gate when in a second operational condition of the computer system;

a phased locked loop device (PLL) that controls the clock signals being fed into the clock trunk;

a delay cell being electrically interconnected to said PLL and a selected branch of said clock tree, wherein the delay cell delays each clock pulse from the selected branch of the clock tree by a predetermined amount for deskewing the clock pulses to the logical F/Fs; and wherein the clock pulses through the selected branch are not blocked from going to the PLL when in the second operational condition of the computer system.

12. The gated balanced clock tree circuit of claim 11 further comprising a plurality of AND gates to control the clock pulses through all branches but the selected branch of the clock trunk.

13. A method for controlling clock pulses to logical flip-flop (F/Fs) of an application specific integrated control circuit (ASIC) comprising the steps of:

providing an ASIC having a gated balanced clock tree circuit that automatically and selectively distributes clock pulses to the logical F/Fs, the clock tree having a plurality of branches therefrom;

configuring the gated balance clock tree circuit so clock pulses are distributed to at least some of the logical F/Fs when a computer system is in a first operational condition; and re-configuring the gated balance clock tree circuit to block the distribution of the clock pulses to the at least some of the logical F/Fs when the computer system is in a second operational condition.

14. The method for controlling clock pulses of claim 13, wherein the gated balance clock tree circuit includes at least one AND gate and wherein said step of configuring includes providing one signal to the AND gate so the clock pulses are distributed and wherein said step of re-configuring includes providing a second signal to the AND gate to block the clock pulses.

15. A method for controlling clock pulses to logical flip-flops F/Fs) of an application specific integrated control circuit (ASIC) comprising the steps of:

providing an ASIC having a gated balanced clock tree circuit that automatically and selectively distributes clock pulses to the logical F/Fs, the clock tree having a plurality of branches therefrom, the gated balance clock tree circuit including a phased locked loop device (PLL) that controls the clock signals being fed into the clock trunk;

configuring the gated balance clock tree circuit so clock pulses are distributed to at least some of the logical F/Fs when a computer system is in a first operational condition;

re-configuring the gated balance clock tree circuit to block the distribution of the clock pulses to the at least some of the logical F/Fs when the computer system is in a second operational condition;

feeding back clock pulses to the PLL from a selected branch of the clock tree circuit;

delaying the clock pulses being feedback a predetermined amount for deskewing the clock pulses to the logical F/Fs; and wherein the clock pulses being feed back are not blocked from going to the PLL when in the second operational condition of the computer system.

16. The method for controlling clock pulses of claim 13, wherein said step of configuring the gated balance clock tree circuit so clock pulses are distributed also is done when the computer system is in a third operational condition.

17. The method for controlling clock pulses of claim 16, wherein the first operational condition corresponds to normal operation of the computer system, wherein the second operational condition corresponds to a fatal error condition of the computer system and wherein the third operational condition corresponds to a system testing of the computer system during at least one of powerup and following the fatal error condition.

18. The method for controlling clock pulses of claim 13, wherein the gated balance clock tree circuit includes a plurality of AND gates and wherein said step of configuring includes providing one signal to the plurality of AND gates so the clock pulses are distributed and wherein said step of re-configuring includes providing a second signal to the plurality of AND gates to block the clock pulses.

19. The method for controlling clock pulses of claim 18, wherein clock pulses are blocked in all branches but a selected branch of the clock tree circuit by the second signal.

20. A system to supply clock pulses in a computer system comprising:

at least first and second clock generation and distribution devices, where the first clock generation and distribution device is set as the source for clock pulses being supplied by the system;

wherein each of the first and second clock generation and distribution devices includes:
  primary oscillator circuitry being electrically configured so as to generate periodic signal pulses,
  detection circuitry being configured electrically to monitor the periodic pulses generated by the oscillator circuitry to detect a failure of that circuitry, and
  signal generating circuitry, responsive to the detection circuitry, that is configured to provide an output signal representative of the detection of a failure of the oscillator circuitry; and clock pulse failover circuitry that is configured so the clock supply system automatically redesignates the source of clock pulses being supplied as the second clock generation and distribution device responsive to a failure signal from the signal generating circuitry of the first clock generation and distribution device.

21. The clock pulse supply system of claim 20 wherein the detection circuitry includes a secondary oscillator circuitry for generating a periodic signal at a different frequency than oscillator circuitry and three flip/flops (F/Fs); and wherein the three F/Fs are electrically interconnected to each other and the primary and secondary oscillators circuitry so the F/Fs detect the failure of the primary oscillator circuitry and provide an output representative of the failure.

22. The clock pulse supply system of claim 21 wherein the output representative of the failure is a signal output from two of the three F/Fs.

23. The clock pulse supply system of claim 21 wherein the three F/Fs are respectively first, second and third F/S where the first F/F is electrically interconnected to the second and third F/Fs and the secondary oscillator circuitry and wherein the second and third F/Fs are electrically interconnected to the primary oscillator circuitry.

24. The clock pulse supply system of claim 21 wherein the primary oscillator circuitry includes a 100 MHz crystal and wherein the secondary oscillator circuitry includes a 105 MHz crystal.

25. A method for supplying clock pulses in a computer system comprising the steps of:

provide a clock supply system including two signal generating devices, that each generate periodic signal pulses, and circuitry for automatically and selectably controlling the source of the clock pulses being supplied to the computer system, where one of said two signal generating devices is initially designated as being the source of the clock pulses being supplied to the computer system;

monitoring the periodic signals being generated by said one of said two signal generating devices sourcing the clock pulses for the computer system;

automatically failing over to the other of said two signal producing devices in response to the detection of a failure of said one of said two signal generating devices to generate periodic signal pulses.

26. The method for supplying clock pulses of claim 25 wherein each signal generating device includes a primary and secondary oscillator circuitry that generate periodic signal pulses at different frequencies and wherein said step of monitoring includes monitoring the output of the primary and secondary oscillators circuitry to detect a failure of the primary oscillator circuitry.

27. The method for supplying clock pulses of claim 25, wherein:

the computer system comprises a plurality of processors, where a first of said plurality of processors includes one of said two signal generating devices and where a second of said plurality of processors includes the other of said two signal generating devices;

the first processor signal generating device is initially designated as being the source of clock pulses supplied to the plurality of processors of the computer system;

said monitoring monitors the clock pulses from the first processor signal generating device; and said automatically failing over, fails over to the second processor signal generating device in response to a failure of the first processor signal generating device to generate periodic signal pulses.

28. The method for supplying clock pulses of claim 27 wherein the computer system includes a multiplicity of processors and wherein the clock pulses sourced from one of the first processor signal generating device and the second processor signal generating device are sourced to the multiplicity of processors.

29. A high availability scalable multiprocessor computer system, comprising:

a backplane, including at least one backplane communication bus and a diagnostic bus;

a plurality of motherboards, detachably connected to said backplane; each motherboard interfacing to said at least one backplane communication bus and to said diagnostic bus, each of said plurality of motherboards including:

at least one backplane communication bus interface mechanism interfacing at least one of said plurality of motherboards to said at least one backplane communication bus;

a memory system including main memory distributed among said plurality of motherboards, directory memory for maintaining main memory coherency with caches on other motherboards, and a memory controller module for accessing said main memory and directory memory and interfacing to said motherboard communication bus;

at least one daughterboard, detachably connected to said motherboard and interfacing to said motherboard communication bus, said at least one daughterboard further including:

a motherboard communication bus interface module, for interfacing said at least one daughterboard to said motherboard communication bus and a local bus on said daughterboard; and at least one cache memory system including cache memory and a cache controller module maintaining said cache memory for a processor of said scalable multiprocessor computer system;

a backplane diagnostic bus interface mechanism interfacing each of said plurality of motherboards to said backplane diagnostic bus;

a microcontroller for processing information and providing outputs; and a test bus controller mechanism including registers therein; a scan chain that electrically interconnects functionalities mounted on each motherboard and each of said at least one daughter board to said test bus controller; and an applications program for execution with said microcontroller, said applications program including instructions and criteria to automatically test the functionalities and electrical connections and interconnections, to automatically determine the presence of a faulted component and to automatically functionally remove the faulted component from the computer system.

30. The high availability scalable multiprocessor computer system of claim 29, wherein at least one of said plurality of motherboards and said at least one daughter board further includes at least one application specific integrated circuit (ASIC) having a gated balanced clock tree circuit that automatically and selectively distributes clock pulses to logical F/Fs of the ASIC, wherein said gated balanced clock tree circuit includes:

a clock trunk in which flows the clock pulses to the logical F/Fs of the ASIC, the clock tree having a plurality of branches extending therefrom;

at least one AND gate being disposed in at least one of the branches of the clock trunk feeding at least some of the logical F/Fs;

control circuitry that controls each of the at least one AND gate so at least some of the logical F/Fs are feed only certain clock pulses; and wherein said control circuitry is configured so the AND gate automatically allows clock pulses to be feed to the at least some of logical F/Fs during a first operational condition of the computer system and wherein said control circuitry is also configured so clock pulses are automatically blocked by the AND gate when in a second operational condition of the computer system.

31. The high availability scalable multiprocessor computer system of claim 30 wherein said gated balanced clock tree circuit further includes:

a phased locked loop device (PLL) that controls the clock signals being fed into the clock trunk;

a delay cell being electrically interconnected to said PLL and a selected branch of said clock tree, wherein the delay cell delays each clock pulse from the selected branch of the clock tree by a predetermined amount for deskewing the clock pulses to the logical F/Fs; and wherein the clock pulses through the selected branch are not blocked from going to the PLL when in the second operational condition of the computer system.

32. The high availability scalable multiprocessor computer system of claim 30 wherein said control circuitry is configured so the AND gate allows clock pulses to be feed to the logical F/Fs when in a third operational condition.

33. The high availability scalable multiprocessor computer system of claim 32, wherein the first operational condition corresponds to normal operation of the computer system, wherein the second operational condition corresponds to a fatal error condition of the computer system and wherein the third operational condition corresponds to a system testing of the computer system during at least one of powerup and following the fatal error condition.

34. The high availability scalable multiprocessor computer system of claim 30, wherein said gated balanced clock tree circuit further includes a plurality of AND gates to control the clock pulses through all branches but the selected branch of the clock trunk.

35. The high availability scalable multiprocessor computer system of claim 30, wherein each of said at least one ASIC are interconnected to said at least one scan chain so said micrcontroller can test each of said at least one ASIC.

36. The high availability scalable multiprocessor computer system of claim 29, further comprising a system to supply clock pulses in a computer system, the system including:
  at least first and second clock generation and distribution devices, where the first clock generation and distribution device is set as the source for clock pulses being supplied by the system;
  wherein each of the first and second clock generation and distribution devices includes:
    primary oscillator circuitry being electrically configured so as to generate periodic signal pulses,
    detection circuitry being configured electrically to monitor the periodic pulses generated by the oscillator circuitry to detect a failure of that circuitry, and
    signal generating circuitry, responsive to the detection circuitry, that is configured to provide an output signal representative of the detection of a failure of the oscillator circuitry; and
  clock pulse failover circuitry that is configured so the clock supply system automatically redesignates the source of clock pulses being supplied as the second clock generation and distribution device responsive to a failure signal from the signal generating circuitry of the first clock generation and distribution device.

37. The high availability scalable multiprocessor computer system of claim 36, wherein the detection circuitry includes a secondary oscillator circuitry for generating a periodic signal at a different frequency than oscillator circuitry and three flip/flops (F/Fs); and wherein the three F/Fs are electrically interconnected to each other and the primary and secondary oscillators circuitry so the F/Fs detect the failure of the primary oscillator circuitry and provide an output representative of the failure.

* * * * *